United States Patent
Sabesan et al.

(10) Patent No.: US 12,306,749 B2
(45) Date of Patent: May 20, 2025

(54) REDUNDANT STORAGE ACROSS NAMESPACES WITH DYNAMICALLY ALLOCATED CAPACITY IN DATA STORAGE DEVICES

(71) Applicant: Western Digital Technologies, Inc., San Jose, CA (US)

(72) Inventors: Sridhar Sabesan, Bangalore (IN); Dinesh Babu, Bangalore (IN); Pavan Gururaj, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/355,771

(22) Filed: Jul. 20, 2023

(65) Prior Publication Data
US 2024/0362161 A1 Oct. 31, 2024

Related U.S. Application Data

(60) Provisional application No. 63/498,037, filed on Apr. 25, 2023.

(51) Int. Cl.
*G06F 12/02* (2006.01)
*G06F 3/06* (2006.01)

(52) U.S. Cl.
CPC .......... *G06F 12/023* (2013.01); *G06F 3/0604* (2013.01); *G06F 3/0665* (2013.01); *G06F 3/0689* (2013.01)

(58) Field of Classification Search
CPC .... G06F 3/0604; G06F 3/0665; G06F 3/0689; G06F 12/023; G06F 12/0646; G06F 2212/262
(Continued)

(56) References Cited

U.S. PATENT DOCUMENTS 6,209,066 B1 * 3/2001 Holzle ................ G06F 12/0269
                                                        711/170
9,047,216 B2 6/2015 Soran
(Continued)

OTHER PUBLICATIONS

Junyi Shu, Ruidong Zhu, Yun Ma, Gang Huang, Hong Mei, Xuanzhe Liu, and Xin Jin. Mar. 25, 2023. Disaggregated RAID Storage in Modern Datacenters. In Proceedings of the 28th ACM International Conference on Architectural Support for Programming Languages and Operating Systems, vol. 3 (ASPLOS 2023). (Year: 2023).*

*Primary Examiner* — Reginald G Bragdon
*Assistant Examiner* — Aaron D Ho
(74) *Attorney, Agent, or Firm* — Patent Law Works LLP

(57) ABSTRACT

Systems, methods, and data storage devices for redundant storage of data across namespaces with dynamic capacity allocation are described. Data storage devices may support multiple host connections to multiple namespaces allocated in their non-volatile storage medium according to a storage protocol, such as non-volatile memory express (NVMe). Each namespace may initially be allocated with an allocated capacity. For at least some of the namespaces, a portion of the allocated capacity may be allocated to a floating namespace pool. A redundant array of independent disks (RAID) configuration may be established across the namespaces for redundant storage of host data. When the fill mark for one of the namespaces reaches a flexible capacity threshold, capacity from the floating namespace pool may be dynamically allocated to that namespace and removed from the floating namespace pool.

20 Claims, 12 Drawing Sheets

(58) Field of Classification Search
USPC .......................................................... 711/154
See application file for complete search history.

(56) References Cited

U.S. PATENT DOCUMENTS

| | | | |
|---|---|---|---|
| 10,564,857 B2 | 2/2020 | Benisty | |
| 10,768,820 B2 | 9/2020 | Subramanian | |
| 10,866,740 B2 | 12/2020 | Benisty | |
| 11,429,293 B1* | 8/2022 | Vankamamidi | G06F 3/0605 |
| 12,106,134 B2 | 10/2024 | Pinto | |
| 2007/0168634 A1* | 7/2007 | Morishita | G06F 3/0665 |
| | | | 711/170 |
| 2009/0234897 A1* | 9/2009 | Qi | G06F 12/0253 |
| 2013/0067186 A1* | 3/2013 | Pronovost | G06F 12/023 |
| | | | 711/170 |
| 2014/0250269 A1* | 9/2014 | Shanbhag | G06F 11/2094 |
| | | | 711/114 |
| 2016/0124843 A1 | 5/2016 | Kanno | |
| 2017/0024160 A1* | 1/2017 | Feldman | G06F 3/064 |
| 2018/0217951 A1 | 8/2018 | Benisty | |
| 2019/0121543 A1* | 4/2019 | Frolikov | G06F 12/0238 |
| 2020/0401348 A1* | 12/2020 | Satoyama | G06F 11/1451 |
| 2021/0103399 A1* | 4/2021 | Lyu | G06F 3/0673 |
| 2021/0334207 A1 | 10/2021 | Kanno | |
| 2022/0137844 A1 | 5/2022 | Goss | |
| 2022/0391091 A1* | 12/2022 | Frolikov | G06F 3/0631 |
| 2023/0058424 A1* | 2/2023 | Frolikov | G06F 3/0659 |
| 2023/0143076 A1* | 5/2023 | Clifton | G06F 3/067 |
| | | | 711/154 |
| 2023/0185476 A1* | 6/2023 | Bert | G06F 3/0605 |
| | | | 711/154 |
| 2023/0418516 A1* | 12/2023 | Weiss | G06F 3/0656 |
| 2024/0427523 A1 | 12/2024 | Gururaj | |

* cited by examiner

| | | | |
|---|---|---|---|
| Floating Capacity 816.1 | Floating Capacity 816.2 | Floating Capacity 816.3 | Floating Capacity 816.4 |
| Buffer Capacity 814.1 | | | Buffer Capacity 814.4 |
| | Buffer Capacity 814.2 | Buffer Capacity 814.3 | |
| Used Capacity 812.1 | Used Capacity 812.2 | Used Capacity 812.3 | Used Capacity 812.4 |
| Block C 822.3 | Parity CD 824.3 | Parity CD 824.4 | Block D 822.4 |
| Block A 822.1 | Block B 822.2 | Parity AB 824.1 | Parity AB 824.2 |
| Namespace 810.1 | Namespace 810.2 | Namespace 810.3 | Namespace 810.4 |

… (1)

REDUNDANT STORAGE ACROSS NAMESPACES WITH DYNAMICALLY ALLOCATED CAPACITY IN DATA STORAGE DEVICES

TECHNICAL FIELD

The present disclosure generally relates to capacity allocation in data storage devices and, more particularly, to dynamic allocation of storage resources across defined host namespaces in a redundant array of independent disks (RAID) configuration.

BACKGROUND

Multi-device storage systems utilize multiple discrete data storage devices, generally disk drives (solid-state drives (SSD), hard disk drives (HDD), hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

To support the faster speeds and low latencies needed for many distributed applications, direct memory access storage protocols, such as non-volatile memory express (NVMe), have become important in storage system deployment. NVMe enables fast access to non-volatile memory devices connected to servers through peripheral component interconnect express (PCIe) buses. Namespaces and corresponding logical host connections may be used to manage access between host applications and the host data stored in the attached namespaces of the data storage devices. In some configurations, NVMe-over-Fabric (NVMeoF) enables servers to share NVMe flash storage as if it were local memory within the host system's file system.

With growing storage demands and the cost of storage, storage arrays, such as storage area networks (SANs), may be thinly provisioned and use administrator notifications when they run out of space. In thinly provisioned deployments, the goal may be to add capacity (in the form of additional data storage devices) only as it is needed. Most disk drives, such as SSDs, have a fixed capacity and it is not possible to add capacity to the data storage device after it is deployed. Similarly, namespaces are generally allocated in the disk drives in fixed capacity blocks. In thinly provisioned systems, underutilized namespaces within individual data storage devices may represent significant wasted capacity that may cause new devices to be added despite available capacity in one or more allocated but underutilized namespaces.

Uneven namespace utilization may be created by a number of factors, typically driven by the corresponding host applications and operational demands. Some namespaces may simply be associated with applications that generate more or less data and, therefore, require different amounts of storage space. Some namespaces may support write intensive applications, while other may be read intensive. Some namespaces may have higher performance requirements, which may impact resource availability for garbage collection and other processes for managing and reclaiming previously used capacity, as well as drive the sheer volume of data being stored or accessed. As a result, some namespaces may be fast filling, while other namespaces may be slower filling. The net result may be capacity starvation for some namespaces and unused capacity for other namespaces.

Under NVMe storage protocols, namespaces have a fixed capacity when created and attached to a host. The host system may, in turn, map the fixed capacity namespaces to available capacity in its file system. The storage system may not have the capability to reallocate capacity within existing data storage devices and corresponding namespaces as, in thin provisioned systems, all capacity in each added data storage device may be allocated to specific namespaces, non-volatile memory (NVM) sets, and/or endurance groups. This difficulty is further complicated in RAID contexts where one or more hosts may define desired RAID configurations for redundantly storing data within a single data storage device or across multiple data storage devices.

Therefore, there still exists a need for storage systems with flexible and dynamic allocation of non-volatile memory capacity among namespaces within thinly provisioned data storage devices that can adapt to the varying usage of those namespaces to support efficient and reliable RAID configurations.

SUMMARY

Various aspects for redundant storage across namespaces with dynamically allocated capacity in one or more data storage devices are described. More particularly, namespaces and/or a portion of a floating namespace pool may be allocated in a RAID configuration and support dynamic allocation of capacity to the namespaces in the RAID set that need it. This may enable namespaces with higher utilization to borrow capacity from underutilized namespaces to prevent the RAID configuration from failing due to starvation of one or more higher utilization namespaces in a thin provisioned system.

One general aspect includes a system that includes at least one data storage device and a controller. Each data storage device of the at least one data storage device may include: a non-volatile storage medium configured to store host data for at least one host system; and a host interface configured to communicate with the at least one host system using a storage protocol. The controller may be configured to: determine a plurality of host connections to a plurality of namespaces in the at least one data storage device, where each namespace of the plurality of namespaces has a first allocated capacity and at least one namespace of the plurality of namespaces allocates a portion of the first allocated capacity to a floating namespace pool; determine a redundant array of independent disks (RAID) configuration that may include a RAID set of namespaces from the plurality of namespaces; store, based on the RAID configuration, host data to the RAID set of namespaces; determine, for a target namespace of the RAID set of namespaces, whether a filled mark of the target namespace meets a flexible capacity threshold for the target namespace; and allocate, responsive to the filled mark meeting the flexible capacity threshold, a capacity unit from the floating namespace pool to the target namespace to increase the first allocated capacity to a second allocated capacity.

Implementations may include one or more of the following features. The RAID set of namespaces may include only namespaces in the non-volatile storage medium of a first data storage device of the at least one data storage device; a first namespace of the RAID set of namespaces may be configured to store a first block of host data; and a second namespace of the RAID set of namespaces may be configured to store a parity block based on the first block of host data. The controller may be further configured to: determine a RAID capacity of each namespace of the RAID set of namespaces for the at least one data storage device; and determine, based on a difference between the first allocated capacity and the RAID capacity of each namespace of the RAID set of namespaces, an unused capacity allocated to the floating namespace pool. The at least one data storage device may include a plurality of data storage devices, and the RAID set of namespaces may include namespaces on at least two data storage devices of the plurality of data storage devices. The controller may be further configured to: receive a request for a new namespace in the plurality of namespaces; determine, from the request, a flexible capacity flag; selectively determine, based on the flexible capacity flag and for the new namespace, a number of capacity units from the new namespace to allocate to the floating namespace pool; determine, from the request, a redundancy flag; and selectively determining, based on the redundancy flag, that the new namespace is in the RAID set of namespaces. The controller may be further configured to: determine, for each namespace of the plurality of namespaces, whether that namespace is an operating type selected from a fast filling namespace or a slow filling namespace; and determine, responsive to allocating the capacity unit from the floating namespace pool and based on the operating type for each namespace of the plurality of namespaces, a source namespace for a physical allocation of the capacity unit. The source namespace may be selected from among slow filling namespaces, and the first allocated capacity of the source namespace may be reduced by the capacity unit. The target namespace may be a first namespace in the RAID set of namespaces, and the source namespace is a second namespace in the RAID set of namespaces. The controller may be further configured to: aggregate contributions to the floating namespace pool from the plurality of namespaces to determine a floating namespace capacity; create at least one virtual namespace using a portion of the floating namespace capacity; and attach the at least one virtual namespace to at least one host system. The at least one virtual namespace may include a plurality of virtual namespaces and the controller may be further configured to: determine a second RAID configuration may include of a second RAID set of namespaces selected from the plurality of virtual namespaces; and store, based on the second RAID configuration, host data to the plurality of virtual namespaces. The controller may be further configured to: determine a hot spare capacity for the RAID configuration; allocate the hot spare capacity from the floating namespace pool to a virtual namespace; recover, responsive to a failure of a namespace in the RAID set of namespaces, data from the failed namespace to the virtual namespace; and attach the virtual namespace to a host system previously attached to the failed namespace.

Another general aspect includes a computer-implemented method including: determining a plurality of host connections to a plurality of namespaces in a non-volatile storage medium of at least one data storage device, where each namespace of the plurality of namespaces has a first allocated capacity and at least one namespace of the plurality of namespaces allocates a portion of the first allocated capacity to a floating namespace pool; determining a redundant array of independent disks (RAID) configuration may include a RAID set of namespaces from the plurality of namespaces; storing, based on the RAID configuration, host data to the RAID set of namespaces; determining, for a target namespace of the RAID set of namespaces, whether a filled mark of the target namespace meets a flexible capacity threshold for the target namespace; and allocating, responsive to the filled mark meeting the flexible capacity threshold, a capacity unit from the floating namespace pool to the target namespace to increase the first allocated capacity to a second allocated capacity.

Implementations may include one or more of the following features. The RAID set of namespaces may include only namespaces in the non-volatile storage medium of a first data storage device of the at least one data storage device; a first namespace of the RAID set of namespaces may be configured to store a first block of host data; and a second namespace of the RAID set of namespaces may be configured to store a parity block based on the first block of host data. The computer-implemented method may include: determining a RAID capacity of each namespace of the RAID set of namespaces for the at least one data storage device; and determining, based on a difference between the first allocated capacity and the RAID capacity of each namespace of the RAID set of namespaces, an unused capacity allocated to the floating namespace pool. The at least one data storage device may include a plurality of data storage devices, and the RAID set of namespaces may include namespaces on at least two data storage devices of the plurality of data storage devices. The computer-implemented method may include: receiving a request for a new namespace in the plurality of namespaces; determining, from the request, a flexible capacity flag; selectively determining, based on the flexible capacity flag and for the new namespace, a number of capacity units from the new namespace to allocate to the floating namespace pool; determine, from the request, a redundancy flag; and selectively determining, based on the redundancy flag, that the new namespace is in the RAID set of namespaces. The computer-implemented method may include: determining, for each namespace of the plurality of namespaces, whether that namespace is an operating type selected from a fast filling namespace or a slow filling namespace; and determining, responsive to allocating the capacity unit from the floating namespace pool and based on the operating type for each namespace of the plurality of namespaces, a source namespace for the physical allocation of the capacity unit. The source namespace may be selected from among slow filling namespaces; the first allocated capacity of the source namespace may be reduced by the capacity unit; the target namespace may be a first namespace in the RAID set of namespaces; and the source namespace may be a second namespace in the RAID set of namespaces. The computer-implemented method may include: aggregating contributions to the floating namespace pool from the plurality of namespaces to determine a floating namespace capacity; creating at least one virtual namespace using a portion of the floating namespace capacity; and attaching the at least one virtual namespace to at least one host system. The computer-implemented method may include: determining a second RAID configuration may include of a second RAID set of namespaces selected from a plurality of virtual namespaces of the at least one virtual namespace; and store, based on the second RAID configuration, host data to the plurality of virtual namespaces. The computer-implemented method may include: determining a hot spare capacity for the RAID configuration; allocating the hot spare capacity from the floating namespace pool to a virtual namespace; recovering, responsive to a failure of a namespace in the RAID set of namespaces, data from the failed namespace to the virtual namespace; and attaching the virtual namespace to a host system previously attached to the failed namespace.

Still another general aspect includes a data storage device that includes: a processor; a memory; a non-volatile storage medium configured to store host data for at least one host system; a host interface configured to communicate with the at least one host system using a storage protocol; means for determining a plurality of host connections to a plurality of namespaces in the non-volatile storage medium, where each namespace of the plurality of namespaces has a first allocated capacity, and at least one namespace of the plurality of namespaces allocates a portion of the first allocated capacity to a floating namespace pool; means for determining a redundant array of independent disks (RAID) configuration may include a RAID set of namespaces including the plurality of namespaces; means for storing, based on the RAID configuration, host data to the RAID set of namespaces; means for determining, for a target namespace of the RAID set of namespaces, whether a filled mark of the target namespace meets a flexible capacity threshold for the target namespace; and means for allocating, responsive to the filled mark meeting the flexible capacity threshold, a capacity unit from the floating namespace pool to the target namespace to increase the first allocated capacity to a second allocated capacity.

The various embodiments advantageously apply the teachings of data storage devices and/or multi-device storage systems to improve the functionality of such computer systems. The various embodiments include operations to overcome or at least reduce the issues previously encountered in storage arrays and/or systems and, accordingly, are more reliable and/or efficient than other computing systems. That is, the various embodiments disclosed herein include hardware and/or software with functionality to improve utilization of non-volatile memory resources in individual data storage devices and across RAID sets of data storage devices in a multi-device storage system, such as by using a floating namespace pool to support dynamic reallocation of capacity across namespaces participating in the RAID configuration. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
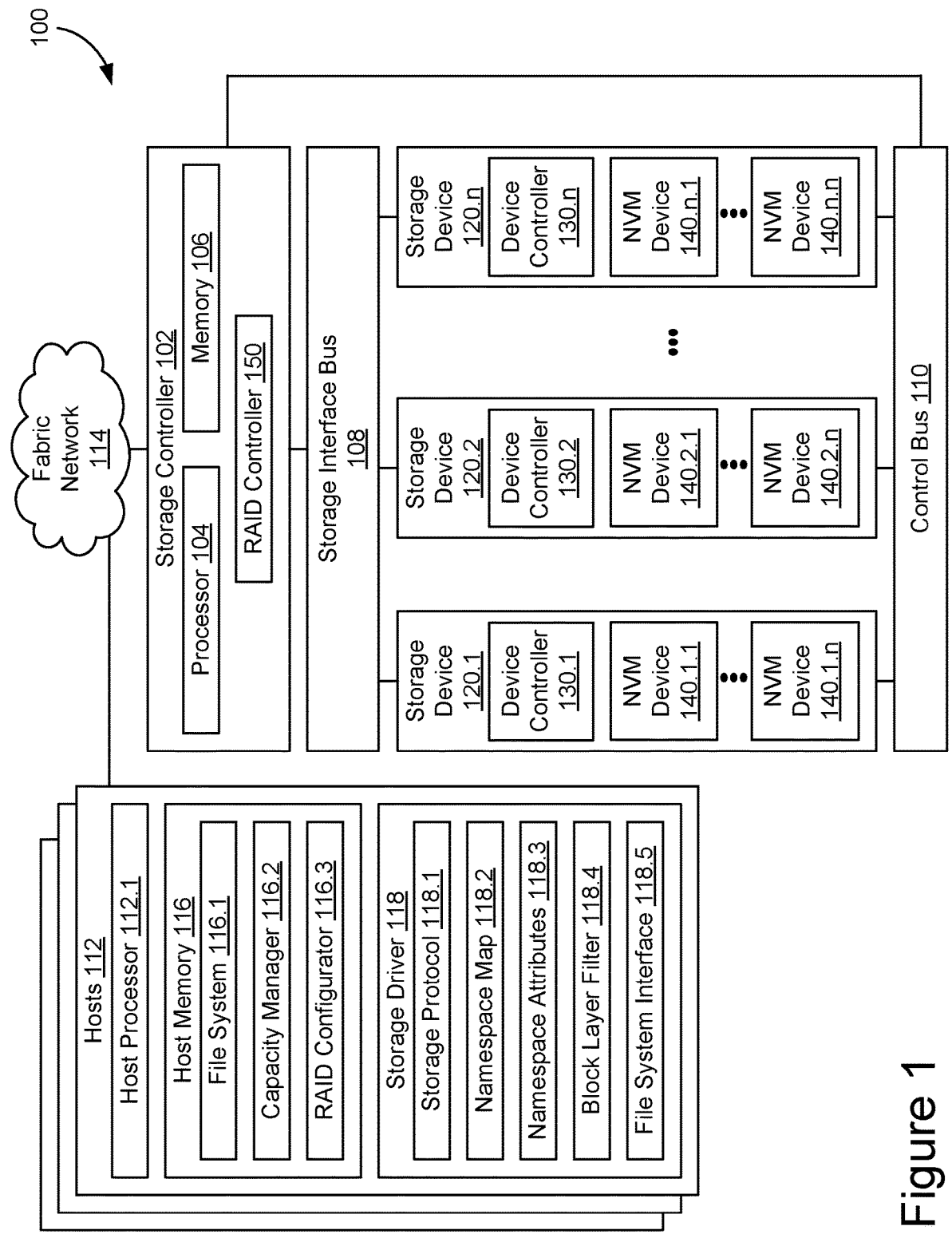
FIG. 1 schematically illustrates a multi-device storage system supporting a plurality of host systems.

FIG. 1 shows an embodiment of an example data storage system 100 with multiple data storage devices 120 supporting a plurality of host systems 112 through storage controller 102. While some example features are illustrated, various other features have not been illustrated for the sake of brevity and so as not to obscure pertinent aspects of the example embodiments disclosed herein. To that end, as a non-limiting example, data storage system 100 may include one or more data storage devices 120 (also sometimes called information storage devices, storage devices, disk drives, or drives) configured in a storage node with storage controller 102. In some embodiments, storage devices 120 may be configured in a server, storage array blade, all flash array appliance, or similar storage unit for use in data center storage racks or chassis. Storage devices 120 may interface with one or more host nodes or host systems 112 and provide data storage and retrieval capabilities for or through those host systems. In some embodiments, storage devices 120 may be configured in a storage hierarchy that includes storage nodes, storage controllers (such as storage controller 102), and/or other intermediate components between storage devices 120 and host systems 112. For example, each storage controller 102 may be responsible for a corresponding set of storage devices 120 in a storage node and their respective storage devices may be connected through a corresponding backplane network or internal bus architecture including storage interface bus 108 and/or control bus 110, though only one instance of storage controller 102 and corresponding storage node components are shown. In some embodiments, storage controller 102 may include or be configured within a host bus adapter for connecting storage devices 120 to fabric network 114 for communication with host systems 112.

In the embodiment shown, a number of storage devices 120 are attached to a common storage interface bus 108 for host communication through storage controller 102. For example, storage devices 120 may include a number of drives arranged in a storage array, such as storage devices sharing a common rack, unit, or blade in a data center or the SSDs in an all flash array. In some embodiments, storage devices 120 may share a backplane network, network switch(es), and/or other hardware and software components accessed through storage interface bus 108 and/or control bus 110. For example, storage devices 120 may connect to storage interface bus 108 and/or control bus 110 through a plurality of physical port connections that define physical, transport, and other logical channels for establishing communication with the different components and subcomponents for establishing a communication channel to host 112. In some embodiments, storage interface bus 108 may provide the primary host interface for storage device management and host data transfer, and control bus 110 may include limited connectivity to the host for low-level control functions. For example, storage interface bus 108 may support peripheral component interface express (PCIe) connections to each storage device 120 and control bus 110 may use a separate physical connector or extended set of pins for connection to each storage device 120.

In some embodiments, storage devices 120 may be referred to as a peer group or peer storage devices because they are interconnected through storage interface bus 108 and/or control bus 110. In some embodiments, storage devices 120 may be configured for peer communication among storage devices 120 through storage interface bus 108, with or without the assistance of storage controller 102 and/or host systems 112. For example, storage devices 120 may be configured for direct memory access using one or more protocols, such as non-volatile memory express (NVMe), remote direct memory access (RDMA), NVMe over fabric (NVMeOF), etc., to provide command messaging and data transfer between storage devices using the high-bandwidth storage interface and storage interface bus 108.

In some embodiments, data storage devices 120 are, or include, solid-state drives (SSDs). Each data storage device 120.1-120.n may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with storage interface bus 108 and/or control bus 110.

In some embodiments, a respective data storage device 120 may include a single medium device while in other embodiments the respective data storage device 120 includes a plurality of media devices. In some embodiments, media devices include NAND-type flash memory or NOR-type flash memory. In some embodiments, data storage device 120 may include one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 120 includes a device controller 130, which includes one or more processing units (also sometimes called central processing units (CPUs), processors, microprocessors, or microcontrollers) configured to execute instructions in one or more programs. In some embodiments, the one or more processors are shared by one or more components within, and in some cases, beyond the function of the device controllers. In some embodiments, device controllers 130 may include firmware for controlling data written to and read from media devices 140, one or more storage (or host) interface protocols for communication with other components, as well as various internal functions, such as garbage collection, wear leveling, media scans, and other memory and data maintenance. For example, device controllers 130 may include firmware for running the NVM layer of an NVMe storage protocol alongside media device interface and management functions specific to the storage device. Media devices 140 are coupled to device controllers 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage devices 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

In some embodiments, storage controller 102 may be coupled to data storage devices 120 through a network interface that is part of host fabric network 114 and includes storage interface bus 108 as a host fabric interface. In some embodiments, host systems 112 are coupled to data storage system 100 through fabric network 114 and storage controller 102 may include a storage network interface, host bus adapter, or other interface capable of supporting communications with multiple host systems 112. Fabric network 114 may include a wired and/or wireless network (e.g., public and/or private computer networks in any number and/or configuration) which may be coupled in a suitable way for transferring data. For example, the fabric network may include any means of a conventional data communication network such as a local area network (LAN), a wide area network (WAN), a telephone network, such as the public switched telephone network (PSTN), an intranet, the internet, or any other suitable communication network or combination of communication networks. From the perspective of storage devices 120, storage interface bus 108 may be referred to as a host interface bus and provides a host data path between storage devices 120 and host systems 112, through storage controller 102 and/or an alternative interface to fabric network 114.

Host systems 112, or a respective host in a system having multiple hosts, may be any suitable computer device, such as a computer, a computer server, a laptop computer, a tablet device, a netbook, an internet kiosk, a personal digital assistant, a mobile phone, a smart phone, a gaming device, or any other computing device. Host systems 112 are sometimes called a host, client, or client system. In some embodiments, host systems 112 are server systems, such as a server system in a data center. In some embodiments, the one or more host systems 112 are one or more host devices distinct from a storage node housing the plurality of storage devices 120 and/or storage controller 102. In some embodiments, host systems 112 may include a plurality of host systems owned, operated, and/or hosting applications belonging to a plurality of entities and supporting one or more quality of service (QoS) standards for those entities and their applications. Host systems 112 may be configured to store and access data in the plurality of storage devices 120 in a multi-tenant configuration with shared storage resource pools accessed through namespaces and corresponding host connections to those host connections.

Host systems 112 may include one or more central processing units (CPUs) or host processors 112.1 for executing compute operations, storage management operations, and/or instructions for accessing storage devices 120, such as storage commands, through fabric network 114. Host systems 112 may include host memories 116 for storing instructions for execution by host processors 112.1, such as dynamic random access memory (DRAM) devices to provide operating memory for host systems 112. Host memories 116 may include any combination of volatile and non-volatile memory devices for supporting the operations of host systems 112.

In some configurations, each host memory 116 may include a host file system 116.1 for managing host data storage to non-volatile memory. Host file system 116.1 may be configured in one or more volumes and corresponding data units, such as files, data blocks, and/or data objects, with known capacities and data sizes. Host file system 116.1 may use at least one storage driver 118 to access storage resources. In some configurations, those storage resources may include both local non-volatile memory devices in host system 112 and host data stored in remote data storage devices, such as storage devices 120, that are accessed using a direct memory access storage protocol, such as NVMe.

In some configurations, each host memory 116 may include a capacity manager 116.2 for managing the storage capacity of one or more storage devices or systems attached to the host and accessible through file system 116.1. For example, capacity manager 116.2 may include a user application integrated in or interfacing with file system 116.1. In some configurations, capacity manager 116.2 may enable attachment to one or more namespaces defined and accessed according to the protocols of storage driver 118. Capacity manager 116.2 may receive configuration and usage information for the namespaces attached through storage driver 118 and mapped to file system 116.1, such as the capacity of the namespace and its current usage or fill level. Capacity manager 116.2 may also receive notifications when available capacity in file system 116.1 and include an interface for requesting additional namespaces from attached storage systems. For example, a namespace manager may determine aggregate unused capacity allocated to a floating namespace pool from storage devices 120 and make it available through virtual namespaces published to hosts 112 for accessing additional capacity.

In some configurations, each host memory 116 may include a RAID configurator 116.3 for configuring redundant data protection for host data stored to storage devices 120. For example, storage controller 102 may include a RAID controller 150 that received host data, allocates it to RAID data blocks, calculates parity blocks, and stores RAID stripes in a distributed fashion among storage devices 120 and/or namespaces therein. In some configurations, one or more hosts 112 may include RAID controller functions as a storage application in host memory 116 and/or feature of storage driver 118. RAID configurator 116.3 may include a user interface for defining RAID configurations for one or more redundant data schemes to support host data storage. RAID configurator 116.3 may allow a user or other system resource to determine target namespaces for a RAID set, RAID type (e.g., RAID 1, RAID 4, RAID 5, RAID 6, etc.), number of RAID nodes, and parameters for parity, block size, stripe logic, and other aspects of each RAID configuration. In some configurations, RAID configurator 116.3 may communicate one or more parameters for a RAID configuration to RAID controller 150 in storage controller 102 for redundant protection of host data stored in data storage devices 120.

Storage driver 118 may be instantiated in the kernel layer of the host operating system for host systems 112. Storage driver 118 may support one or more storage protocols 118.1 for interfacing with data storage devices, such as storage devices 120. Storage driver 118 may rely on one or more interface standards, such as PCIe, ethernet, fibre channel, etc., to provide physical and transport connection through fabric network 114 to storage devices 120 and use a storage protocol over those standard connections to store and access host data stored in storage devices 120. In some configurations, storage protocol 118.1 may be based on defining fixed capacity namespaces on storage devices 120 that are accessed through dynamic host connections that are attached to the host system according to the protocol. For example, host connections may be requested by host systems 112 for accessing a namespace using queue pairs allocated in a host memory buffer and supported by a storage device instantiating that namespace. Storage devices 120 may be configured to support a predefined maximum number of namespaces and a predefined maximum number of host connections. When a namespace is created, it is defined with an initial allocated capacity value and that capacity value is provided to host systems 112 for use in defining the corresponding capacity in file system 116.1. In some configurations, storage driver 118 may include or access a namespace map 118.2 for all of the namespaces available to and/or attached to that host system. Namespace map 118.2 may include entries mapping the connected namespaces, their capacities, and host LBAs to corresponding file system volumes and/or data units. These namespace attributes 118.3 may be used by storage driver 118 to store and access host data on behalf of host systems 112 and may be selectively provided to file system 116.1 through a file system interface 118.5 to manage the block layer storage capacity and its availability for host applications.

Because namespace sizes or capacities are generally regarded as fixed once they are created, a block layer filter 118.4 may be used between the storage device/namespace interface of storage protocol 118.1 and file system interface 118.5 to manage dynamic changes in namespace capacity. Block layer filter 118.4 may be configured to receive a notification from storage devices 120 and/or storage controller 102 and provide the interface to support host file system resizing. Block layer filter 118.4 may be a thin layer residing in the kernel space as a storage driver module. Block layer filter 118.4 may monitor for asynchronous commands from the storage node (using the storage protocol) that include a namespace capacity change notification. Once an async command with the namespace capacity change notification is received by block layer filter 118.4, it may parse a capacity change value and/or an updated namespace capacity value from the notification and generate a resize command to host file system 116.1. Based on the resize command, file system 116.1 may adjust the capacity of the volume mapped to that namespace. Block layer filter 118.4 may also update namespace attributes 118.3 and namespace map 118.2, as appropriate.

Storage controller 102 may include one or more central processing units (CPUs) or processors 104 for executing compute operations, storage management operations, and/or instructions for accessing storage devices 120 through storage interface bus 108. In some embodiments, processors 104 may include a plurality of processor cores which may be assigned or allocated to parallel processing tasks and/or processing threads for different storage operations and/or host storage connections. In some embodiments, processor 104 may be configured to execute fabric interface for communications through fabric network 114 and/or storage interface protocols for communication through storage interface bus 108 and/or control bus 110. In some embodiments, a separate network interface unit and/or storage interface unit (not shown) may provide the network interface protocol and/or storage interface protocol and related processor and memory resources.

Storage controller 102 may include a memory 106 configured to support a plurality of queue pairs allocated between host systems 112 and storage devices 120 to manage command queues and storage queues for host storage operations against host data in storage devices 120. In some embodiments, memory 106 may include one or more DRAM devices for use by storage devices 120 for command, management parameter, and/or host data storage and transfer. In some embodiments, storage devices 120 may be configured for direct memory access (DMA), such as using RDMA protocols, over storage interface bus 108.

In some configurations, storage controller 102 may include or interface with a RAID controller 150 for redundant storage of host data to storage devices 120. For example, RAID controller 150 may include functions for determining a RAID configuration, storing host data to storage devices 120 according to that RAID configuration, and/or recovering host data (e.g., RAID rebuild) following the loss, failure, or other disruption of one of the components storing RAID protected data. In some configurations, RAID controller 150 may support RAID configurations across namespaces as RAID nodes, where a set of namespaces provide the RAID set used in the RAID configurations. Namespaces in a RAID set may be distributed across storage devices 120, where a single namespace is selected from each storage device to reduce the risk of simultaneous failure due to device failure. In some RAID configurations, multiple failures may be tolerated and use of multiple namespaces on the same device may be acceptable. Similarly, different NVMe devices 140 may be considered "drives" for failure tolerance and defining namespaces on different NVMe devices may suffice for the desired fault tolerance. In some configurations, a RAID configuration may be defined solely within a single data storage device 120, with all namespaces in the RAID set being selected in the same data storage device, though possible distributed among NVMe devices within that storage device. An example RAID controller will be described further with regard to FIG. 5.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2A:
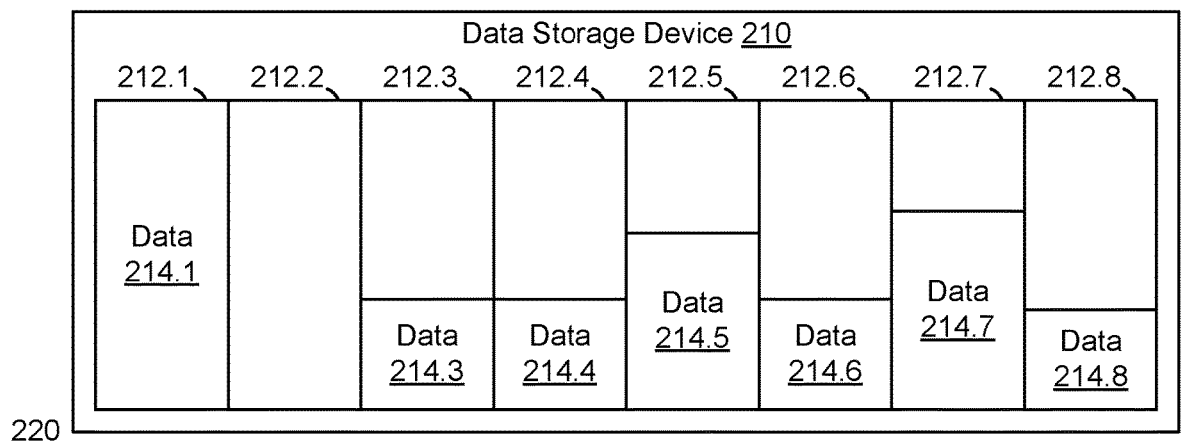
FIG. 2a schematically illustrates namespaces with different operating characteristics in a data storage device.
Figure 2B:
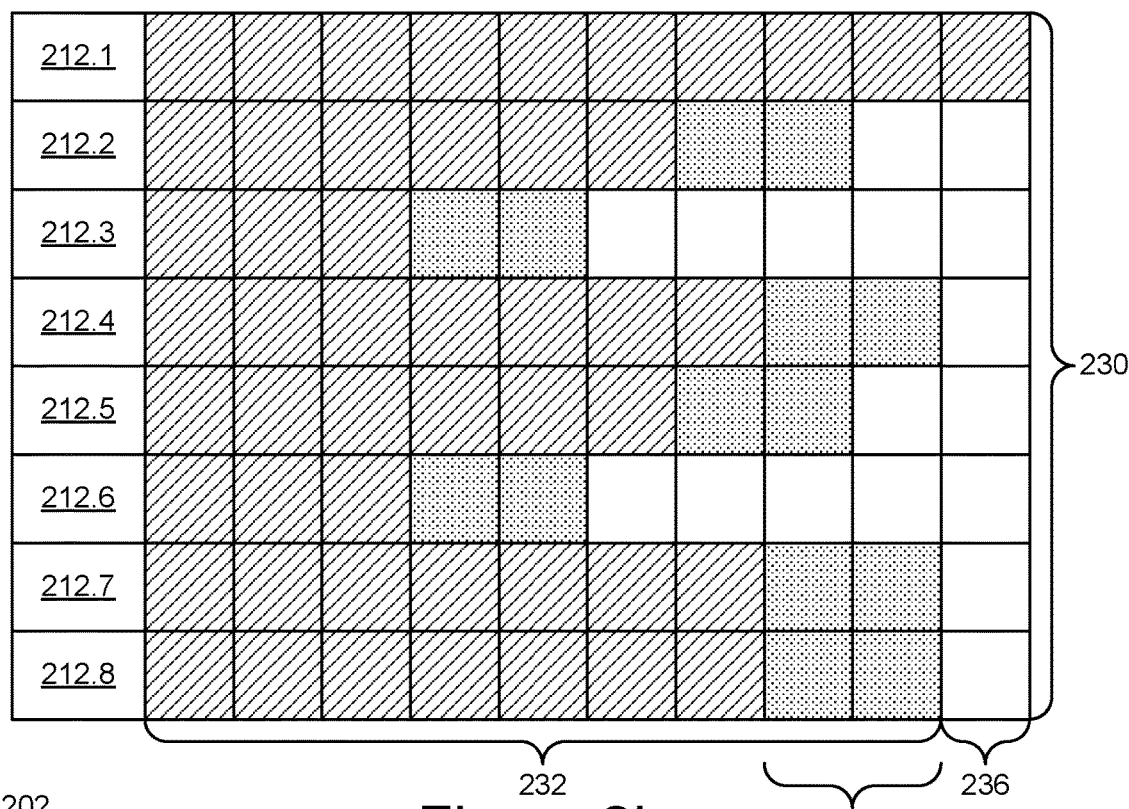
FIG. 2b schematically illustrates namespace allocations with contributions to a floating namespace pool.

FIGS. 2a and 2b show schematic representations of how the namespaces 212 in an example data storage device 210, such as one of storage devices 120 in FIG. 1, may be used by the corresponding host systems and support dynamic capacity allocation. FIG. 2a shows a snapshot of storage space usage and operating types for namespaces 212. FIG. 2b shows the current capacity allocations for those namespaces, supporting a number of capacity units contributing to a floating namespace pool.

In the example shown, storage device 210 has been allocated across eight namespaces 212.1-212.8 having equal initial capacities. For example, storage device 210 may have a total capacity of 8 terabytes (TB) and each namespace may be created with an initial capacity of 1 TB to align with the physical capacity and interface support of the storage device. Namespace 212.1 may have used all of its allocated capacity, the filled mark for host data 214.1 at 1 TB. Namespace 212.2 may be empty or contain an amount of host data too small to represent in the figure, such as 10 gigabytes (GB). Namespaces 212.3-212.8 are shown with varying levels of corresponding host data 214.3-214.8 stored in memory locations allocated to those namespaces, representing different current filled marks for those namespaces.

Additionally, the use of each namespace may vary on other operating parameters. For example, most of the namespaces may operate with an average or medium fill rate 222, relative to each other and/or system or drive populations generally. However, two namespaces 212.3 and 212.4 may be exhibiting significant variances from the medium range. For example, namespace 212.3 may be exhibiting a high fill rate 222.3 that is over a high fill rate threshold (filling very quickly) and namespace 212.4 may be exhibiting a low fill rate 222.4 that is below a low fill rate threshold (filling very slowly). Similarly, when compared according to input/output operations per second (IOPS) 224, most of namespaces 212 may be in a medium range, but two namespaces 212.5 and 212.6 may be exhibiting significant variances from the medium range for IOPS. For example, namespace 224.5 may be exhibiting high IOPS 224.5 (e.g., 1.2 GB per second) that is above a high IOPS threshold and namespace 212.6 may be exhibiting low IOPS 224.6 (e.g., 150 megabytes (MB) per second) that is below a low IOPS threshold. When compared according to whether read operations or write operations are dominant (R/W 226), most namespaces 212 may be in a range with relatively balanced read and write operations, but two namespaces 212.7 and 212.8 may be exhibiting significant variances from the medium range for read/write operation balance. For example, namespace 212.6 may be exhibiting read intensive operations 226.7 that are above a read operation threshold and namespace 212.8 may be exhibiting write intensive operations 226.8 that are above a write operation threshold. Similar normal ranges, variances, and thresholds may be defined for other operating parameters of the namespaces, such as sequential versus random writes/reads, write amplification/endurance metrics, time-dependent storage operation patterns, etc. Any or all of these operating metrics may contribute to operating types for managing allocation of capacity to and from a floating namespace pool.

To improve utilization of namespaces, each namespace may be identified as to whether they are able to contribute unutilized capacity to a floating capacity pool to reduce capacity starvation of namespaces with higher utilization. For example, a system administrator may set one or more flags when each namespace is created to determine whether it will participate in dynamic capacity allocation and, if so, how. Floating capacity for namespaces may consist of unused space from read-intensive namespaces and/or slow filling namespaces, along with unallocated memory locations from NVM sets and/or NVM endurance groups supported by the storage protocol. The floating capacity may not be exposed to or attached to any host, but maintained as a free pool stack of unused space, referred to as a floating namespace pool, from which the capacity can ben dynamically allocated to expand any starving namespace.

In the example shown in FIG. 2B, each namespace 212 has been configured with an initial allocated capacity of ten capacity units 230. For example, if each namespace is allocated 1 TB of physical memory locations, each capacity unit would be 100 GB of memory locations. Namespaces 212, other than namespace 212.1, have been configured to support a floating namespace pool (comprised of the white capacity unit blocks). Each namespace includes a guaranteed capacity 232 and most of the namespaces include flexible capacity 236. In some configurations, guaranteed capacity 232 may include a buffer capacity 234 above a current or expected capacity usage. For example, capacity units 230 with diagonal lines may represent utilized or expected capacity, capacity units 230 with dots may represent buffer capacity, and capacity units 230 with no pattern may be available in the floating namespace pool. Guaranteed capacity 232 may be the sum of utilized or expected capacity and the buffer capacity. The floating namespace pool may be comprised of the flexible capacity units from all of the namespaces and provide an aggregate pool capacity that is the sum of those capacity units. For example, the floating namespace pool may include two capacity units from namespaces 212.2 and 212.5, five capacity units from namespaces 212.3 and 212.6, and one capacity unit from namespaces 212.4, 212.7 and 212.8, for an aggregate pool capacity of 17 capacity units. The allocations may change over time as capacity blocks from the floating namespace pool are used to expand the guaranteed capacity of namespaces that need it. For example, as fast filling namespace 212.3 receives more host data, capacity units may be allocated from the floating namespace pool to the guaranteed capacity needed for the host storage operations. The capacity may initially be claimed from the floating capacity blocks normally allocated to namespace 212.3, but may ultimately require capacity blocks from other namespaces, resulting in a guaranteed capacity larger than the initial 10 capacity units.

As described below, initial values for guaranteed storage and contributions to flexible capacity may be determined when each namespace is created. Some namespaces, such as namespace 212.1, may not participate in the floating namespace pool at all and may be configured entirely with guaranteed capacity, similar to prior namespace configurations. This may allow some namespaces to opt out of the dynamic allocation and provide guaranteed capacity for critical applications and host data. Some namespaces may use a system default for guaranteed and flexible capacity values. For example, the system may be configured to allocate a default portion of the allocated capacity to guaranteed capacity and a remaining portion to flexible capacity. In one configuration, the default guaranteed capacity may be 50% and the default flexible capacity may be 50%. So, for namespaces with the default configuration, such as namespaces 212.3 and 212.6, the initial guaranteed capacity value may be 5 capacity units and the flexible capacity value may be 5 capacity units. Some namespaces may use custom allocations of guaranteed and flexible capacity. For example, during namespace creation, the new namespace command may include custom capacity attributes to allow custom guaranteed capacity values and corresponding custom flexible capacity values. In the example shown, the remaining namespaces may have been configured with custom capacity attributes resulting in, for example, namespaces 212.2 and 212.5 having guaranteed capacity values of 8 capacity units and flexible capacity values of 2 capacity units. Additionally (as further described below), the guaranteed capacity values may change from the initial values over time as additional guaranteed capacity is allocated to namespaces that need it.

Figure 3:
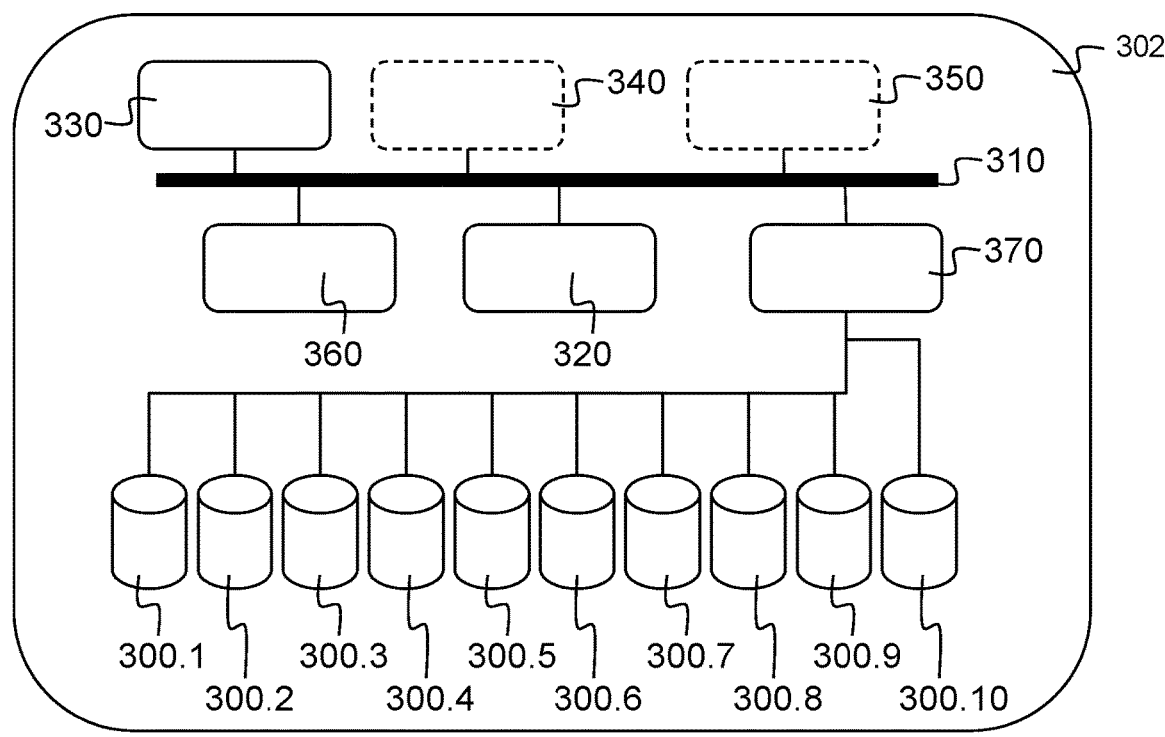
FIG. 3 schematically illustrates a storage node of the multi-device storage system of FIG. 1.

FIG. 3 shows a schematic representation of a storage node 302. For example, storage controller 102 may be configured as a storage node 302 for accessing storage devices 120 as storage elements 300. Storage node 302 may comprise a bus 310, a storage node processor 320, a storage node memory 330, one or more optional input units 340, one or more optional output units 350, a communication interface 360, a storage element interface 370 and a plurality of storage elements 300.1-300.10. In some embodiments, at least portions of bus 310, processor 320, local memory 330, communication interface 360, storage element interface 370 may comprise a storage controller, backplane management controller, network interface controller, or host bus interface controller, such as storage controller 102. Bus 310 may include one or more conductors that permit communication among the components of storage node 302. Processor 320 may include any type of conventional processor or microprocessor that interprets and executes instructions. Local memory 330 may include a random-access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said storage node 302, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 302 to communicate with other devices and/or systems, for example mechanisms for communicating with other storage nodes 302 or host systems 112. Storage element interface 370 may comprise a storage interface, such as a Serial Advanced Technology Attachment (SATA) interface, a Small Computer System Interface (SCSI), PCIe, etc., for connecting bus 310 to one or more storage elements 300, such as one or more storage devices 120, for example, 2 terabyte SATA-II disk drives or 2 TB NVMe solid state drives (SSDs), and control the reading and writing of data to/from these storage elements 300. As shown in FIG. 3, such a storage node 302 could comprise ten 2 TB NVMe SSDs as storage elements 300.1-300.10 and, in this way, storage node 302 would provide a storage capacity of 20 TB to the storage system 100.

Storage elements 300 may be configured as redundant or operate independently of one another. In some configurations, if one particular storage element 300 fails its function can easily be taken on by another storage element 300 in the storage system. Furthermore, the independent operation of the storage elements 300 allows to use any suitable mix of types storage elements 300 to be used in a particular storage system 100. It is possible to use for example storage elements with differing storage capacity, storage elements of differing manufacturers, using different hardware technology such as for example conventional hard disks and solid-state storage elements, using different storage interfaces, and so on. All this results in specific advantages for scalability and flexibility of storage system 100 as it allows to add or remove storage elements 300 without imposing specific requirements to their design in correlation to other storage elements 300 already in use in that storage system 100.

Figure 4:
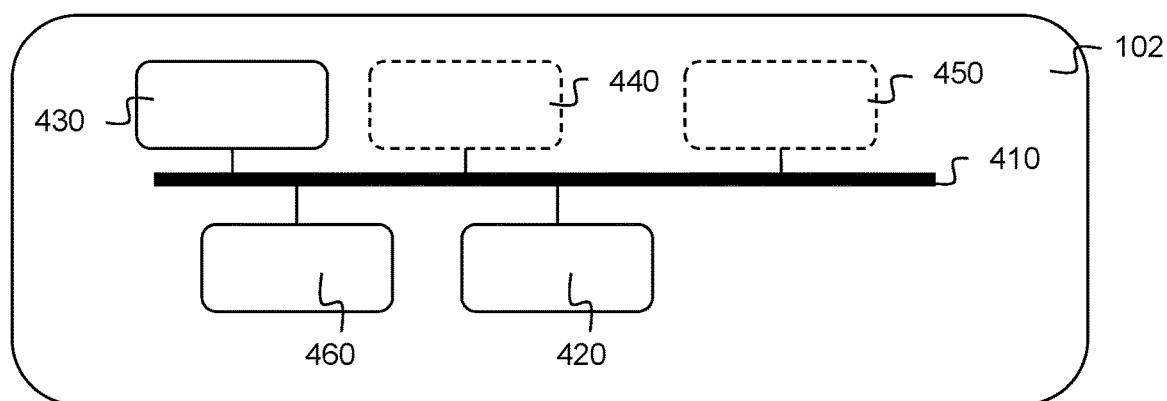
FIG. 4 schematically illustrates a host node of the multi-device storage system of FIG. 1.

FIG. 4 shows a schematic representation of an example host system 112. Host system 112 may comprise a bus 410, a processor 420, a local memory 430, one or more optional input units 440, one or more optional output units 450, and a communication interface 460. Bus 410 may include one or more conductors that permit communication among the components of host 112. Processor 420 may include any type of conventional processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. An optional input unit 440 may include one or more conventional mechanisms that permit an operator to input information to host 112 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables host 112 to communicate with other devices and/or systems.

Figure 5:
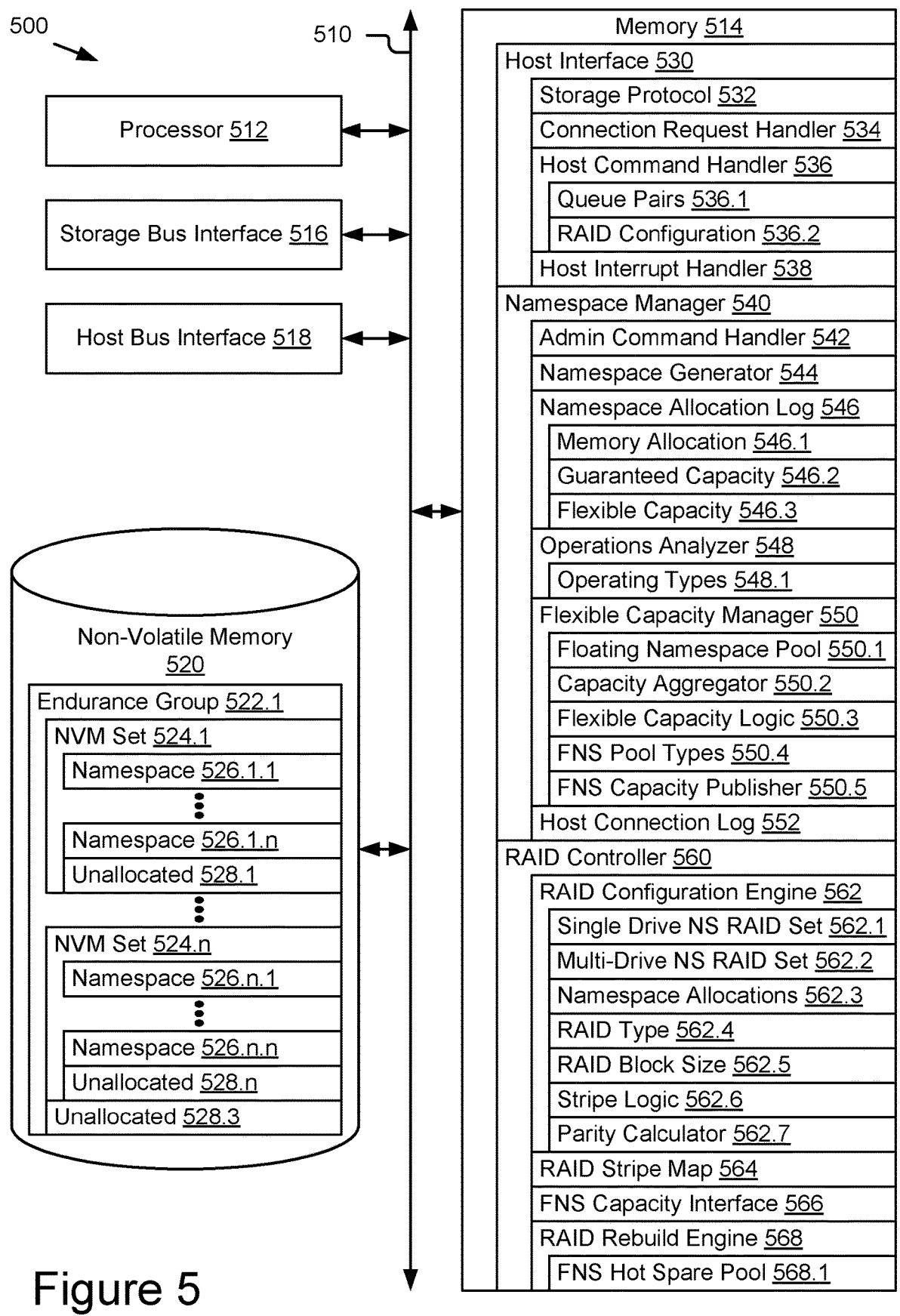
FIG. 5 schematically illustrates some elements of the storage node of FIG. 1-3 in more detail.

FIG. 5 schematically shows selected modules of a storage node 500 configured for dynamic allocation of namespace capacity using a floating namespace pool and, more particularly, supporting RAID configurations that advantageously utilize the floating namespace pool. Storage node 500 may incorporate elements and configurations similar to those shown in FIGS. 1-3. For example, storage node 500 may be configured as storage controller 102 and a plurality of storage devices 120 supporting host connection requests and storage operations from host systems 112 over fabric network 114. In some embodiments, the functions of host interface 530, namespace manager 540, and non-volatile memory 520 may all be instantiated in a single data storage device, such as within device controller 130 of one of data storage devices 120.

Storage node 500 may include a bus 510 interconnecting at least one processor 512, at least one memory 514, and at least one interface, such as storage bus interface 516 and host bus interface 518. Bus 510 may include one or more conductors that permit communication among the components of storage node 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element.

Storage bus interface 516 may include a physical interface for connecting to one or more data storage devices using an interface protocol that supports storage device access. For example, storage bus interface 516 may include a PCIe or similar storage interface connector supporting NVMe access to solid state media comprising non-volatile memory devices 520. Host bus interface 518 may include a physical interface for connecting to a one or more host nodes, generally via a network interface. For example. host bus interface 518 may include an ethernet connection to a host bus adapter, network interface, or similar network interface connector supporting NVMe host connection protocols, such as RDMA and transmission control protocol/internet protocol (TCP/IP) connections. In some embodiments, host bus interface 518 may support NVMeoF or similar storage interface protocols.

Storage node 500 may include one or more non-volatile memory devices 520 or similar storage elements configured to store host data. For example, non-volatile memory devices 520 may include at least one SSD and/or a plurality of SSDs or flash memory packages organized as an addressable memory array. In some embodiments, non-volatile memory devices 520 may include NAND or NOR flash memory devices comprised of single level cells (SLC), multiple level cell (MLC), triple-level cells, quad-level cells, etc. Host data in non-volatile memory devices 520 may be organized according to a direct memory access storage protocol, such as NVMe, to support host systems storing and accessing data through logical host connections. Non-volatile memory devices 520, such as the non-volatile memory devices of an SSD, may be allocated to a plurality of namespaces 526 that may then be attached to one or more host systems for host data storage and access. Namespaces 526 may be created with allocated capacities based on the number of namespaces and host connections supported by the storage device. In some configurations, namespaces may be grouped in non-volatile memory sets 524 and/or endurance groups 522. These groupings may be configured for the storage device based on the physical configuration of non-volatile memory devices 520 to support efficient allocation and use of memory locations. These groupings may also be hierarchically organized as show, with endurance groups 522 including NVM sets 524 that include namespaces 526. In some configurations, endurance groups 522 and/or NVM sets 524 may be defined to include unallocated capacity 528, such as memory locations in the endurance group or NVM set memory devices that are not yet allocated to namespaces to receive host data. For example, endurance group 522 may include NVM sets 524.1-524.$n$ and may also include unallocated capacity 528.3. NVM sets 524.1-524.$n$ may include namespaces 526.1.1-526.1.$n$ to 526.$n$.1-526.$n$.$n$ and unallocated capacity 528.1 and 528.$n$.

Storage node 500 may include a plurality of modules or subsystems that are stored and/or instantiated in memory 514 for execution by processor 512 as instructions or operations. For example, memory 514 may include a host interface 530 configured to receive, process, and respond to host connection and data requests from client or host systems. Memory 514 may include a namespace manager 540 configured to manage the creation and capacity of namespaces using a floating namespace pool. Memory 514 may include a RAID controller 560 configured to define RAID configurations, allocate host data (from host storage commands) according to the RAID configuration(s), and rebuild RAID-stored host data in the event of a device failure. In some configurations, the functions of host interface 530, namespace manager 540, and/or RAID controller 560 may be instantiated in one or more hardware controller devices comprising bus 510, processor 512, memory 514, storage bus interface, 516, and host bus interface 518 and communicatively connected to at least one host system and at least one data storage device.

Host interface 530 may include an interface protocol and/or set of functions and parameters for receiving, parsing, responding to, and otherwise managing requests from host nodes or systems. For example, host interface 530 may include functions for receiving and processing host requests for establishing host connections with one or more namespaces stored in non-volatile memory 520 for reading, writing, modifying, or otherwise manipulating data blocks and their respective client or host data and/or metadata in accordance with host communication and storage protocols. In some embodiments, host interface 530 may enable direct memory access and/or access over NVMeoF protocols, such as RDMA and TCP/IP access, through host bus interface 518 and storage bus interface 516 to host data units stored in non-volatile memory devices 520. For example, host interface 530 may include host communication protocols compatible with ethernet and/or another host interface that supports use of NVMe and/or RDMA protocols for data access to host data 520.1. Host interface 530 may be configured for interaction with a storage driver of the host systems and enable non-volatile memory devices 520 to be directly accessed as if they were local storage within the host systems. For example, connected namespaces in non-volatile memory devices 520 may appear as storage capacity within the host file system and defined volumes and data units managed by the host file system.

In some embodiments, host interface 530 may include a plurality of hardware and/or software modules configured to use processor 512 and memory 514 to handle or manage defined operations of host interface 530. For example, host interface 530 may include a storage protocol 532 configured to comply with the physical, transport, and storage application protocols supported by the host for communication over host bus interface 518 and/or storage bus interface 516. For example, host interface 530 may include a connection request handler 534 configured to receive and respond to host connection requests. For example, host interface 530 may include a host command handler 536 configured to receive host storage commands to a particular host connection. For example, host interface 530 may include a host interrupt handler configured to provide interrupt commands to the host systems. In some embodiments, host interface 530 may include additional modules (not shown) for command handling, buffer management, storage device management and reporting, and other host-side functions.

In some embodiments, storage protocol 532 may include both PCIe and NVMe compliant communication, command, and syntax functions, procedures, and data structures. In some embodiments, storage protocol 532 may include an NVMeoF or similar protocol supporting RDMA, TCP/IP, and/or other connections for communication between host nodes and target host data in non-volatile memory 520, such as namespaces attached to the particular host by at least one host connection. Storage protocol 532 may include interface definitions for receiving host connection requests and storage commands from the fabric network, as well as for providing responses to those requests and commands. In some embodiments, storage protocol 532 may assure that host interface 530 is compliant with host request, command, and response syntax while the backend of host interface 530 may be configured to interface with connection namespace manager 540 to provide dynamic allocation of capacity among namespaces.

Connection request handler 534 may include interfaces, functions, parameters, and/or data structures for receiving host connection requests in accordance with storage interface protocol 532, determining an available processing queue, such as a queue-pair, allocating the host connection (and corresponding host connection identifier) to a storage device processing queue, and providing a response to the host, such as confirmation of the host storage connection or an error reporting that no processing queues are available. For example, connection request handler 534 may receive a storage connection request for a target namespace in a NVMe-oF storage array and provide an appropriate namespace storage connection and host response. In some embodiments, connection request handler 534 may interface with namespace manager 540 to update host connection log 552 for new host connections. For example, connection request handler 534 may generate entries in a connection log table or similar data structure indexed by host connection identifiers and including corresponding namespace and other information.

In some embodiments, host command handler 536 may include interfaces, functions, parameters, and/or data structures to provide a function similar to connection request handler 534 for storage requests directed to the host storage connections allocated through connection request handler 534. For example, once a host storage connection for a given namespace and host connection identifier is allocated to a storage device queue-pair, the host may send any number of storage commands targeting data stored in that namespace. Host command handler 536 may maintain queue pairs 336.1 that include a command queue for storage commands going to non-volatile memory devices 520 and a response or completion queue for responses indicating command state and/or returned host data locations, such as read data written to the corresponding host memory buffer for access by the host systems. In some configurations, host command handler 536 passes host storage commands to the storage device command queues and corresponding NVM device manager (not shown) for executing host data operations related to host storage commands received through host interface 530 once a host connection is established. For example, PUT or Write commands may be configured to write host data units to non-volatile memory devices 520. GET or Read commands may be configured to read data from non-volatile memory devices 520. DELETE or Flush commands may be configured to delete data from non-volatile memory devices 520, or at least mark a data location for deletion until a future garbage collection or similar operation actually deletes the data or reallocates the physical storage location to another purpose.

In some embodiments, host command handler 536 may be configured to receive administrative commands related to RAID configuration, such as RAID configuration commands 536.2. For example, RAID controller 560 may receive parameters from host commands related to one or more configuration parameters, such as RAID sets, RAID type, block size, stripe logic, parity, etc. RAID configuration commands 536.2 may be received to create and configure a new RAID configuration. Host command handler 536 may parse RAID configuration commands 536.2 and pass resulting parameters, calls, etc. to RAID controller 560 for execution.

In some embodiments, host interrupt handler 538 may include interfaces, functions, parameters, and/or data structures to enable storage node 500 to communicate with the host systems outside of the storage commands and responses supported by host command handler 536. For example, host interrupt handler 538 may respond to storage device states and events to provide interrupt commands to the host systems through storage protocol 532 and a storage driver of the host systems. In some embodiments, namespace manager 540 may generate one or more notification events and pass handling of those notification events to host interrupt handler 538. For example, when the guaranteed capacity of a namespace changes, a capacity change notification may be sent to the connected host system for that namespace as an interrupt command. As another example, when a floating namespace capacity threshold is reached and indicates that the storage device is low on floating namespace capacity, a capacity needed notification may be sent to the host systems and/or a storage system administrator to indicate that a new storage device should be added (or other system level configuration changes should be made) to assure continued available capacity for the host applications. In some configurations, host interrupt handler 538 may also support RAID messages or notifications back to the host systems, such as RAID capacity notifications, node failure notifications, rebuild notifications, etc.

Namespace manager 540 may include an interface protocol and/or set of functions, parameters, and data structures for defining new namespaces in non-volatile memory devices 520 and managing changes in capacity using a floating namespace pool. For example, namespace manager 540 may receive new namespace requests for a data storage device to allocate the capacity of that storage device among a set of namespaces with allocated capacities of a defined capacity value, such as dividing the 8 TB capacity of a storage device among eight different namespaces. Namespace manager 540 may process command parameters and/or configuration settings for the new namespaces to determine whether and how each namespace supports the floating namespace pool for flexible capacity. For example, each namespace request may include one or more request parameters corresponding to enabling flexible capacity and defining the guaranteed and flexible capacity allocations for that namespace. Once the namespace capacity allocations are defined, namespace manager 540 may monitor and algorithmically and automatically adjust capacity allocations of the set of namespaces by reallocating capacity units from the floating namespace pool to namespaces that need additional capacity. Namespace manager 540 may also send, in cooperation with host interface 530, notifications to host and/or administrative systems as namespace capacities change and/or more capacity is needed.

In some embodiments, namespace manager 540 may include a plurality of hardware and/or software modules configured to use processor 512 and memory 514 to handle or manage defined operations of namespace manager 540. For example, namespace manager 540 may include and/or access an administrative command handler 542 configured to communicate with an administrator system for namespace requests, configuration, and administrative notifications. For example, namespace manager 540 may include and/or access a namespace generator 544 configured to allocate namespaces on non-volatile memory devices 520 in response to namespace requests received through host interface 530 and/or administrative command handler 542. For example, namespace manager 540 may include and/or access a namespace allocation log 546 configured to record and maintain capacity allocations for the namespaces and floating namespace pool. For example, namespace manager 540 may include and/or access an operations analyzer configured to determine operating characteristics of the namespaces. For example, namespace manager 540 may include and/or access a flexible capacity manager 550 configured to manage the floating namespace pool and capacity changes for the namespaces. For example, namespace manager 540 may include and/or access a host connection log 552 configured to record and maintain a log of the active host connections for the namespaces.

Administrative command handler 542 may include interfaces, functions, parameters, and/or data structures to interact with an administrative system used to provision and configure namespaces for use by the host systems. For example, one or more host systems and/or a dedicated administrative system may include an administrative user interface for configuring and monitoring the storage system including storage node 500. Administrative command handler 542 may provide an interface for receiving administrative commands, such as new namespace, NVM set, and/or endurance group requests, for namespace manager 540. In some embodiments, administrative command handler 542 may receive namespace requests and parse a set of namespace parameters related to the request for use by namespace generator 544. For example, administrative command handler may determine the request type and parse request parameters corresponding to namespace capacity allocation, enabling flexible capacity, and/or guaranteed capacity allocation. In some embodiments, storage protocol 532 may define the administrative commands and predetermined locations within those commands for the request parameters used by namespace generator 544.

Namespace generator 544 may include interfaces, functions, parameters, and/or data structures to allocate and configured new namespaces for non-volatile memory devices 520. For example, when a new storage device is added to storage node 500, the storage device may have a storage device configuration that determines a total available capacity and a number of namespaces that can be supported by the device. Namespace generator 544 may receive new namespace request parameters from administrative command handler 542 and use them to configure each new namespace in the new storage device. In some embodiments, namespace generator 544 may determine a capacity allocation for the namespace. For example, the namespace request may include a capacity allocation value for the new namespace based on how the system administrator intends to allocate the memory space in the storage device's non-volatile memory devices, such as dividing the memory locations equally among a number of namespaces or individually allocating different allocated capacities to each namespace. Once capacity allocation is determined, a set of memory locations in non-volatile memory devices 520 meeting the capacity allocation may be associated with the namespace. In some configurations, the namespace may be associated with an NVM set and/or endurance group and the memory locations may be selected from the set of memory locations previously assigned to the corresponding NVM set and/or endurance group.

Namespace generator 544 may include initial capacity logic for determining whether a new namespace is participating in the flexible capacity feature of the storage device and make the initial allocations of guaranteed capacity and flexible capacity. The initial capacity logic may use request parameter values related to the namespace creation request to determine the initial capacities and how they are allocated between guaranteed and flexible capacity. One or more flexible capacity flags may determine whether or not the namespace will participate in the floating namespace pool and dynamic capacity allocation. For example, the namespace request may include a flexible capacity flag in a predetermined location in the request message and the value of the flag may be parsed by admin command handler 542 and passed to namespace generator 544. Where the namespace is part of an NVM set and/or endurance group, the initial capacity logic may check flag values related to the NVM set and/or endurance group to see whether flexible capacity is enabled. In some configurations, these parameters may also determine whether unallocated capacity from the NVM set and/or endurance group may be used to support the floating capacity pool (in addition to the flexible capacity from each participating namespace). For example, namespace generator 544 may check whether the namespace is part of an NVM set or endurance group and check the NVM set or endurance group for the flag, such as the $127^{th}$ bit of the NVM set list or an NVM set attribute entry for the endurance group. In some embodiments, the flexible capacity flag may be set for the namespace based on a vendor specific field in the namespace create data structure or reserved field of the command Dword. For example, within a vendor specific field defined by the storage protocol specification, such as command Dword 11 of the create namespace data structure, one or more bits may be defined as the flexible capacity flag, with a 1 value indicating that flexible capacity should be enabled for the namespace and a 0 value indicating that flexible capacity should not be enabled for the namespace. Similarly, a reserved field, such as command Dword 11, may include bits reserved for namespace management parameters related to selecting namespace management operations and one of these bits may be used to define a namespace creation operation that enables flexible namespace.

Once a namespace is determined to participate in the flexible capacity and floating namespace pool, initial capacity logic may determine initial values for the guaranteed capacity and the flexible capacity of the namespace. For example, the allocated capacity may be divided between a guaranteed capacity value and a flexible capacity value, where the sum of those values equals the allocated capacity value for the namespace. In some embodiments, each namespace that is not being enabled for flexible capacity may treat its entire capacity allocation as guaranteed capacity. For example, 1 TB namespace would have a guaranteed capacity of 1 TB (all capacity units in the namespace) and a flexible capacity of zero. In some embodiments, the initial capacity logic may use a custom capacity attribute and/or default capacity values to determine the initial capacity values. For example, the namespace request may include a field for a custom capacity attribute containing one or more custom capacity parameter values for setting the guaranteed capacity and/or flexible capacity values. If the custom capacity attribute is not set, then the initial capacity logic may use default capacity values. In some embodiments, the storage system may include configuration settings for default capacity values, such as a default guaranteed capacity value and a default flexible capacity value, such as 50% guaranteed capacity and 50% flexible capacity. In some embodiments, the default capacity values may include a plurality of guaranteed/flexible capacity values that are mapped to different operating types, as described below for operations analyzer 548, and may receive an operating type used as a key for indexing the default values, such as from operations analyzer 548 or from an operating type parameter configured in the namespace request. Namespace generator 544 may determine a set of namespace attributes for the new namespace, including the initial guaranteed and flexible capacity values, and provide those namespace attributes to other components, such as a namespace directory used by host systems to connect to the new namespace and/or namespace allocation log 546.

Namespace allocation log 546 may include interfaces, functions, parameters, and/or data structures to store the initial capacity allocation values for new namespaces and manage changes to those values during flexible capacity operations. For example, namespace allocation log 546 may include a data structure or algorithm for indicating the memory locations corresponding to the capacity allocation. Memory allocation 546.1 may indicate the specific sets of memory locations in non-volatile memory 520 and whether they are guaranteed capacity 546.2 or flexible capacity 546.3 for that namespace. As further described below, the memory locations may be reallocated in capacity units over time as the floating namespace pool is used to support expansion of the guaranteed capacity of the namespaces that need it. For example, namespace allocation log 546 may include a map or similar lookup table or function for each namespace's memory allocation 546.1 and which memory locations or capacity units are currently allocated as guaranteed capacity 546.2 or flexible capacity 546.3.

Operations analyzer 548 may include interfaces, functions, parameters, and/or data structures to analyze the data storage operations, including host data and command types and patterns, for determining how a namespace is being used. For example, operations analyzer 548 may analyze a set of host operations to the namespace to determine whether the namespace is slow filling, fast filling, or within a normal or medium fill range. Operating types 548.1 for the namespaces may be used by flexible capacity manager 550 to determine when and whether namespaces should be allocated additional guaranteed capacity from the floating namespace pool and which namespaces should provide the additional capacity from their flexible capacity. In some embodiments, operations analyzer 548 may include or access a dataset management function or service of storage node 500 and/or the specific storage device for determining one or more operating parameters of the namespace. For example, the dataset management function may be configured to process transaction logs to monitor operating parameters, such as read operations, write operations, operations per unit time, memory/capacity usage, endurance metrics, etc. In some embodiments, operations analyzer 548 may determine operating parameters for fill rate, read versus write (e.g., percentage of read commands versus write commands), IOPS, and the current used capacity of the namespace (e.g., a filled mark corresponding to the memory locations and/or capacity units in the namespace currently storing host data). In some embodiments, operations analyzer 548 may use the operating parameters to classify each namespace into one or more operating types, such as a fast filling type or a slow filling type, a high read type or a high write type, or a high performance type or a low performance type. For example, operations analyzer 548 may include operating type ranges that map operating parameter values to the operating types. In some embodiments, the operating type ranges may define at least one operating parameter threshold value that, if met, defines the namespace as one type or another. For example, a fill rate threshold may define whether a fill rate value for the namespace is classified as a fast filling namespace or a slow filling namespace. In some embodiments, the operating type ranges may define more than two types using multiple ranges and thresholds, such high, medium/normal, and low types. In some embodiments, the operating type ranges may include mapping multiple operating parameters to one or more operating types. For example, whether a namespace is classified as fast filling or slow filling may be based on mapping read versus write, IOPS, and change rates for the filled mark using weighted factors for each operating parameter to determine a composite fill rate value and corresponding fill rate type.

Flexible capacity manager 550 may include interfaces, functions, parameters, and/or data structures to determine floating namespace pool 550.1 and allocate flexible capacity from the pool to namespaces that need it. For example, once the initial capacity values are determined for the set of namespaces in a storage device, flexible capacity manager 550 may monitor storage operations and/or operating parameters from operations analyzer 548 to determine when a namespace has exceeded or is approaching its guaranteed capacity and allocate additional capacity units to that namespace. Floating namespace pool 550.1 may include the plurality of capacity units allocated to flexible capacity for the set of namespaces. For example, flexible capacity manager 550 may include a capacity aggregator 550.2 that sums the capacity units in the flexible capacity portion of each namespace in the set of namespaces to determine the aggregate capacity of floating namespace pool 550.1. In some embodiments, flexible capacity manager 550 may also have access to unallocated capacity from other regions of non-volatile memory devices 520. For example, unallocated capacity may include some or all of unallocated memory locations in one or more NVM sets and/or endurance groups. In this context, unallocated memory locations may be those memory locations that are associated with an NVM set and/or endurance group but are not allocated to a namespace within that NVM set and/or endurance group, such as unallocated memory 528.

Flexible capacity manager 550 may include flexible capacity logic 550.3 that monitors and responds to changes in the capacity used for host data in each namespace. For example, each time a storage operation is processed or on some other time interval or event basis, flexible capacity logic 550.3 may determine the filled mark for the target namespace for the storage operation and/or each namespace and evaluate the filled mark relative to the guaranteed capacity to determine whether additional capacity is needed by that namespace. In some embodiments, flexible capacity logic 550.3 may also include an operating type check to determine one or more operating types for the namespace, such as operating types 548.1 from operations analyzer 548, as a factor in determining whether additional capacity is need by that namespace and/or from which other namespace's flexible capacity the additional capacity should come from. For example, flexible capacity logic 550.3 may check whether the namespace is fast filling or slow filling for the purposes of determining when and whether to add guaranteed capacity and/or decrease flexible capacity for a namespace. In some configurations, flexible capacity logic 550.3 may operate on namespaces allocated to a RAID set of namespaces to reallocate capacity among namespaces within the RAID set or to or from other namespaces or unallocated capacity within the storage system.

Flexible capacity manager 550 may use one or more capacity thresholds for determining whether and when capacity should be added to a namespace. For example, flexible capacity manager 550 may use a flexible capacity threshold to evaluate the filled mark for the namespace to trigger the addition of capacity. In some embodiments, the flexible capacity threshold may be set at a portion of the guaranteed capacity, such 50%, 80%, or 90%, with the complementary portion corresponding to a buffer capacity in the guaranteed capacity. So, when the filled mark meets the flexible capacity threshold, such as X % of the guaranteed capacity (or guaranteed capacity—X, if X is a fixed buffer capacity), flexible capacity logic 550.3 selects at least one capacity unit from floating namespace pool 550.1 to expand the guaranteed capacity of that namespace. For example, a number of capacity units at least meeting a difference between the filled mark and capacity threshold (the amount the filled mark is over the capacity threshold). In some embodiments, the flexible capacity thresholds may be based on amount of flexible capacity being used (i.e., the filled mark is allowed to exceed the guaranteed capacity until a threshold amount of flexible capacity it used). For example, the flexible capacity threshold may be set at 50% of the flexible capacity, so when the filled mark meets or exceeds guaranteed capacity +50% of flexible capacity, the addition of capacity may be triggered. Note that adding capacity units to the namespace increases the total capacity allocation for that namespace, adding new memory locations to memory allocation 546.1. As a result, guaranteed capacity 546.2 and flexible capacity 546.3 may also be recalculated by flexible capacity logic 550.3. For example, the number of added capacity units may be added to the guaranteed capacity (and the flexible capacity may remain unchanged). In some embodiments, guaranteed capacity 546.2 may at least be increased to the current filled mark and/or filled mark plus buffer capacity.

In some embodiments, flexible capacity logic 550.3 may also determine which other namespace the capacity units from floating namespace pool 550.1 are moved from. For example, flexible capacity logic 550.3 may include a guaranteed capacity threshold compared to the filled mark of the source namespace and an operating type of the source namespace to determine whether the capacity units can be spared. In some configurations, flexible capacity logic 550.3 may organize floating namespace pool 550.1 into a prioritized stack of capacity units from the different namespaces and, in some cases, may include unallocated capacity. Flexible capacity logic 550.3 may select the next capacity unit from the stack to provide needed capacity to a target namespace. In some configurations, flexible capacity logic 550.3 may support different FNS pool types 550.4 that may allocate capacity units from the stack to specific uses. For example, where floating namespace pool 550.1 supports one or more RAID configurations, a portion of floating namespace pool 550.1 may be allocated to one or more hot spares pools for the RAID configurations. In some configurations, virtual namespaces may be allocated out of the floating namespace pool. Virtual namespaces may be configured similarly to namespaces defined through namespace generator 544, except that their memory locations are drawn from the memory stack corresponding to floating namespace pool 550.1. Additional aspects of flexible capacity logic 550.3 may be described with regard to the methods and examples below.

In some embodiments, flexible capacity logic 550.3 may include one or more thresholds or events that trigger notifications to other systems. For example, when a namespace (total) capacity allocation is changed because capacity units have been added or removed, a capacity change notification should be sent to connected host systems. As another example, an aggregate capacity threshold may be evaluated against the capacity units remaining in floating namespace pool 550.1 to determine when a host system and/or administrative system should be notified that more capacity is need for storage node 500 and additional storage units should be added. Flexible capacity manager 550 may include a notification interface for passing notification requests to admin command handler 542 and/or host interrupt handler 538. For example, each time capacity units are moved from a source namespace to a target namespace, one or more capacity change notification may be generated to invoke command interrupts to the effected host systems. In some configurations, flexible capacity manager 550 may include a floating namespace pool capacity publisher 550.5. For example, the capacity determined by capacity aggregator 550.2 may be published in one or more capacity parameters sent to host systems and/or system administrators. As capacity from floating namespace pool 550.1 is allocated to supporting starving namespaces and/or reserved for other purposes, such as hot spare pools or virtual namespaces, changes in the total capacity and/or breakdowns of allocations to floating namespace pool types may be provided to host systems by capacity publisher 550.5.

Host connections log 552 may include interfaces, functions, parameters, and/or data structures to map the namespaces to one or more host connections. For example, after namespaces are created by namespace generator 544, they may be included in a discovery log for storage node 500 and/or the storage device allocated the namespace. Host systems may discover the namespaces in storage node 500 and/or the storage device and request host connections to those namespaces as needed by their applications and determined by storage protocol 532. Responsive to these requests, host systems may be attached to the requested namespaces to allow that host to send storage commands to a queue pair allocated for that host connection. In some embodiments, host interface 530 may use host connection log 552 to determine the host systems and interrupt command paths for host interrupt handler 538.

RAID controller 560 may include an interface protocol and/or set of functions, parameters, and data structures for establishing redundant storage of host data using a defined RAID configuration that uses namespaces as the "drives" in the RAID. For example, RAID controller 560 may receive host commands for establishing a RAID-5 redundant storage scheme across six different namespaces as the RAID set. In some configurations, the six different namespaces may be in the same storage device or they may be distributed across up to six different storage devices. RAID controller 560 may receive one or more commands to create or modify the RAID configuration, then process subsequent host storage commands according to the RAID configuration to store the host data redundantly in the data storage devices. In some configurations, RAID controller 560 may also include functions for detecting failed storage devices (and/or no longer accessible "failed" namespaces) and initiate recovery of host data through a RAID rebuild.

In some embodiments, RAID controller 560 may include a plurality of hardware and/or software modules configured to use processor 512 and memory 514 to handle or manage defined operations of RAID controller 560. For example, RAID controller 560 may include a RAID configuration engine configured to determine the redundant storage scheme to be used for storing and accessing host data, such as RAID type/level, participating namespaces, and block, parity, and striping parameters. For example, RAID controller 560 may include a RAID stripe map 564 configured to track the redundant storage of host data blocks according to the RAID configuration for data access and/or RAID rebuild. For example, RAID controller 560 may include a FNS capacity interface 566 configured to use flexible capacity manager 550 to support flexible capacity allocation over the operation of the RAID, such as supplying additional capacity from floating namespace pool 550.1 when a namespace in the RAID set is starved for capacity. For example, RAID controller 560 may include a RAID rebuild engine 568 configured to rebuild the RAID in response to one or more failed namespaces and/or storage devices hosting those namespaces.

RAID configuration engine 562 may include interfaces, functions, parameters, and/or data structures to determine a RAID configuration for redundantly storing host data written to the set of namespaces in the RAID. For example, RAID configuration engine 562 may support a variety of configuration parameters for defining a RAID configuration and may use a combination of host system or system admin inputs and/or automatically generated parameter settings to define a particular RAID on the storage node. Note that RAID controller 560 and RAID configuration engine 562 may support definition of multiple concurrent RAIDs on storage node 500 using one or more of the storage devices therein and their respective namespaces.

In some configurations, RAID configuration engine 562 supports defining RAIDs across namespaces as the "independent drives/disks". For example, RAID configuration engine 562 may support selecting a set of namespaces as the RAID nodes of the RAID. In some configurations, namespace parameters (in a namespace request or namespace metadata) may determine whether a namespace may be used in a RAID configuration. For example, a redundancy flag in the namespace parameters may determine whether capacity from the namespace may be allocated to a RAID. In some configurations, the redundancy flag(s) may support multiple RAID configuration classes, such as a RAID over namespace (RoNS) flag, a RAID over floating namespace (RoFNS) flag, and/or a RAID over virtual namespace (RoVNS) flag. In some configurations, RAID configuration engine 562 may support defining a RAID on a single data storage device as a single drive namespace RAID set 562.1. For example, a storage device may include eight different namespaces and four namespaces may be selected by RAID configuration engine 562 to be organized as a RAID. In some configurations, RAID configuration engine 562 may support defining a RAID across multiple storage devices as a multi-drive namespace RAID set 562.2. For example, six storage devices in an array may each include four namespaces and a RAID with six RAID nodes may be defined using one namespace for each storage device, two namespaces from three different storage devices, or any other combination. RAID configuration engine 562 may automatically select namespaces as RAID nodes and/or receive input from host systems and/or system administrators for determining the specific namespaces in the RAID set. Once the namespaces are determined, RAID configuration engine 562 may determine namespace allocations 562.3. For example, RAID configurations engine 562 may access namespace allocation log 546 to determine the total memory allocations, guaranteed capacity, and flexible capacity of each namespace. In some configurations, each namespace may have the same allocated capacity and, in some configurations, different namespaces may have different allocated capacities. Over time, the dynamic allocation of capacity by flexible capacity manager 550 may change namespace allocations 562.3 to support how host data is actually written across the RAID set.

RAID configuration engine 562 may determine a set of parameters for storing host data across the RAID set of namespaces. For example, RAID configuration engine 562 may be configured with a default set of RAID parameters based on the number of namespaces in the RAID set. In some configurations, the default set of RAID parameters may be determined and/or modified by host systems configured to store data to the RAID and/or responsible system administrators. Example RAID parameters may include a RAID type 562.4, a RAID block size 562.5, stripe logic 562.6, parity calculator 562.7, and/or other parameters for defining the operation of the RAID. RAID type 562.4 may include a parameter corresponding to a standard RAID level for the RAID and/or designation of RAID nodes and mirroring, parity, and/or striping for those nodes. For example, RAID type 562.4 may include RAID 1, RAID 4, RAID 5, and RAID 6 options based on a compatible RAID set of namespaces. RAID block size 562.6 may include one or more parameters for determining the size of the host data blocks to be written to each node in a RAID stripe. For example, RAID block size 562.6 may be a fixed block size or an algorithm for dynamically determining block size based on host data rates and data commit thresholds. Stripe logic 562.6 may include one or more parameters for determining how host data blocks and parity data blocks are written across the set of namespaces in the RAID set. For example, parity may be distributed to designated parity namespaces, rotated (e.g., round-robin, randomized, etc.) among all namespaces, or follow another stripe logic. Stripe logic 562.6 may include parameters for data commit timing or threshold parameters for buffering and/or writing host data blocks, as well as calculating and storing corresponding parity blocks. Parity calculator 562.7 may include parameters for determining how and where parity is calculated. For example, RAID controller 560 and/or specific storage devices may support parity calculation and these parameters may define where parity is calculated based on the namespace that will receive the host data and/or parity data blocks. Other RAID parameters may be defined for each RAID configuration by RAID configuration engine 562.

RAID stripe map 564 may include interfaces, functions, parameters, and/or data structures to store a host data and parity data index for the RAID. For example, as host data units, such as LBAs, are allocated to RAID data blocks, related parity blocks are calculated, and the RAID stripes are stored across the RAID set, RAID stripe map 564 may store the index data for locating a particular host data unit. In some configurations, RAID stripe map 564 may also be used by RAID rebuild engine 568 to locate parity, redundant copies, and available host data for recovering data previously stored to a failed namespace.

Floating namespace capacity interface 566 may include interfaces, functions, parameters, and/or data structures to access the functions of flexible capacity manager 550 to support operation of RAID controller 560. For example, as host data is stored to the RAID, different namespaces may fill at different rates and fast filling namespaces may benefit from dynamic increases in capacity based on floating namespace pool 550.1. In some configurations, RAID controller 560 may monitor the filled mark for each namespace before or after committing each RAID stripe and notify flexible capacity manager 550 that one or more namespaces is in need of additional capacity.

RAID rebuild engine 568 may include interfaces, functions, parameters, and/or data structures to rebuild one or more RAIDs in response to the failure of one or more namespaces in the RAID set. For example, when a namespace becomes unresponsive, such as due to failure of the NVMe device having the physical memory locations of the namespace, the storage device containing the namespace, and/or the communication path to the storage device, RAID rebuild engine 568 may use the host and parity data remaining in the responsive (non-failed) subset of namespaces to rebuild the missing data from the failed namespace. In some configurations, upon determining one or more failures in the RAID set, those namespaces may enter a rebuild status to rebuild the data from the failed namespace to a new namespace, referred to as a hot spare namespace. In some configurations, flexible capacity manager 550 may be configured to allocate and maintain a floating namespace hot spare pool 568.1 for each RAID that supports floating namespace hot spares. For example, if the allocated namespaces of the RAID set have allocated capacities of 1 TB, flexible capacity manager 550 may reserve a set of capacity units in floating namespace pool 550.1 equal to 1 TB to provide hot spare capacity for any needed rebuild. In some configurations, capacity interface 566 may monitor the largest allocated capacity among the RAID set (as some may increase or decrease over time to support the flexible capacity) and communicate that capacity requirement to flexible capacity manager 550 to increase (or decrease) the capacity for hot spare pool 568.1 to remain right-sized with the RAID namespaces in the event that the largest namespace is the one that fails. In some configurations, Flexible capacity manager 550 may define virtual namespaces within floating namespace pool 550.1 that may be used by host systems for host data storage, including the definition of additional RAIDs across virtual namespaces. Flexible capacity manager 550 may allocate hot spare pool 568.1 as a virtual namespace and reserve it for system use rather than making it available as a virtual host namespace (unless and until it is required as a hot spare). RAID rebuild engine 568 may rebuild the host data and/or parity data blocks from the failed namespace in the hot spare virtual namespace and then advertise and attach the hot spare virtual namespace to the host systems to replace the failed namespace and return the RAID to normal operation. An additional hot spare pool 568.1 may then be allocated for the RAID, if capacity is available in floating namespace pool 550.1.

Figure 6:
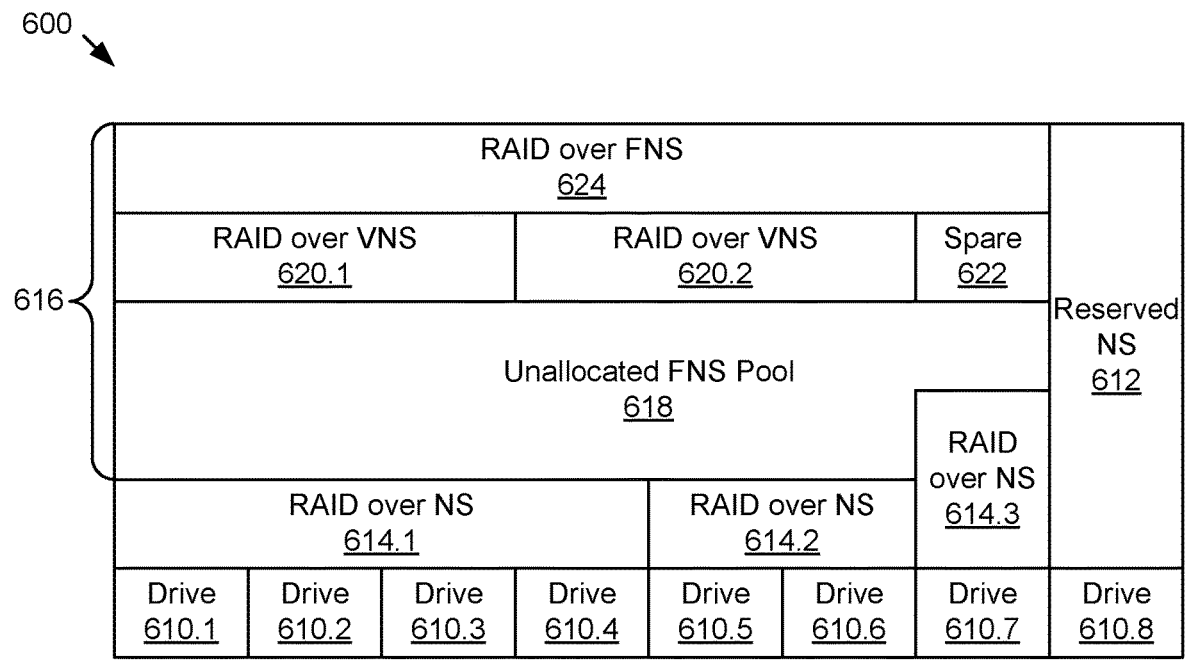
FIG. 6 schematically illustrates a hierarchy of capacity usage based on RAID configuration across namespaces supported by a floating namespace pool.

As shown in FIG. 6, a set of storage devices (e.g., drives 610) in a storage node 600 may support a hierarchy of capacity allocation and usage based on a floating namespace pool. In the example shown, drives 610.1-610.8 are storage devices in storage node 600, such as an all flash array. The namespaces of drive 610.8 have been configured as dedicated namespaces reserved for use by the host systems attached to those namespaces. For example, reserved namespaces 612 may include namespaces created without their flexible capacity flag enabled, so act as conventional namespaces without dynamic capacity and neither contribute to or receive capacity from the floating namespace pool. Storage node 600 has been configured with a number of RAIDs over namespaces 614.1-614.3. For example, RAID 614.1 comprises namespaces in drives 610.1-610.4, RAID 614.2 comprises namespaces in drives 610.5-610.6, and RAID 614.3 comprises multiple namespaces in drive 610.7.

Above RAIDs 614, flexible capacity and unallocated capacity of endurance groups contribute to an initial floating namespace pool 616. Storage node 600 may maintain an unallocated floating namespace pool 618 to support the buffer capacity and flexibility of the namespaces in RAIDs 614. Storage node 600 may also allocated floating namespace capacity from initial floating namespace pool 616 to virtual namespaces that support RAID over virtual namespaces 620.1 and 620.2. These virtual namespaces may be comprised of capacity from the floating namespace pool aggregated across any and all of drives 610.1-610.7. RAIDs 620 may be the result of capacity advertised to one or more host systems and a request to use the capacity as virtual namespaces supporting the two RAID configurations. Storage node 600 may also allocate a portion of floating namespace pool 616 to a virtual namespace reserved as a hot spare 622 for one or more of the RAIDs. In some configurations, storage node 600 may automatically allocate a portion of initial floating namespace pool 616 to a RAID across the floating namespace pool (RoFNS) 624. For example, based on the available capacity and reservation of the anticipated flexible capacity in unallocated floating namespace pool 618, the storage node may determine an optimized RAID configuration across unused memory locations in drives 610.1-610.7. RoFNS 624 may have the lowest priority and may lose its capacity allocations to support the various namespaces below it in the hierarchy.

Figure 7:
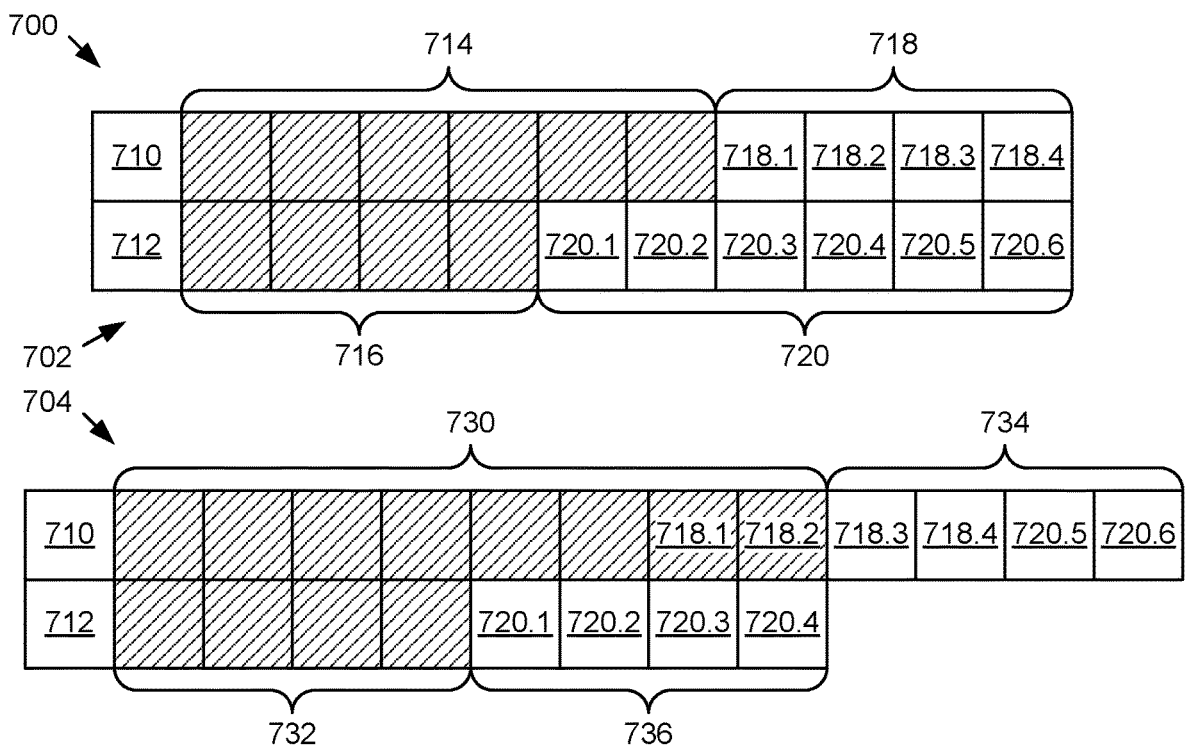
FIG. 7 schematically illustrates two example namespaces before and after dynamic reallocation of capacity.

In FIG. 7, flexible capacity logic, such as the described above for flexible capacity manager 550 in storage node 500, for non-volatile memory 700 may take initial allocations 702 of capacity units and move them between namespaces 710 and 712 as needed to updated allocations 704. For example, namespaces 710 and 712 may both include initial allocated capacities of ten capacity units, where each capacity unit is a set of memory locations, such as a number of pages in a non-volatile memory device. In the example shown, the namespaces may have different initial guaranteed and flexible capacities. Namespace 710 may be a fast filling operating type configured with guaranteed capacity 714 of six capacity units and flexible capacity 718 of four capacity units 718.1-718.4. Namespace 712 may be a slow filling operating type configured with guaranteed capacity 716 of four capacity units and flexible capacity 720 of six capacity units 720.1-720.6. In initial allocation 702, the four capacity units of flexible capacity 718 and the six capacity units of flexible capacity 720 may be contributed to a floating capacity pool that would now include at least 10 capacity units (capacity units 718.1-718.4 and 720.1-720.6).

During operation of the storage device including memory 700, an event may be triggered to allocate capacity from the floating namespace pool to namespace 710. For example, the filled mark of namespace 710 may reach guaranteed capacity 714 or a guaranteed capacity threshold based on guaranteed capacity 714 and/or flexible capacity 718, such as 80% of guaranteed capacity 714 or guaranteed capacity 714+50% of flexible capacity 718. Responsive to the guaranteed capacity threshold being met, the flexible capacity logic may determine a number of capacity units to be reallocated from the floating namespace pool to namespace 710 as shown in updated allocations 704. The number of capacity units allocated may be based on an update value that determines the number of capacity units to be moved. For example, a system or user configurable update value may set a fixed number of capacity units or a percentage of flexible capacity 718 to add to namespace 710, such as 50% of flexible capacity 718, which equals two capacity units. In the example shown, two capacity units are added to increase updated guaranteed capacity 730 to eight capacity units. For example, the first two capacity units 718.1 and 718.2 from initial or previous flexible capacity 718 are reallocated to updated guaranteed capacity 730. The size of the flexible capacity for namespace 710 may not change because additional capacity units from the floating namespace pool are added to updated flexible capacity 734, increasing the total allocation of capacity units to namespace 710 to twelve capacity units. Twelve capacity units may be a resized or updated total capacity allocation of namespace 710 in the updated allocation 704.

In this limited example, the floating namespace pool may only have the ten capacity units shown in initial allocation 702. The capacity units allocated to namespace 710 in updated allocation 704 may come from the flexible capacity of namespace 712. For example, capacity blocks 720.5 and 720.6 from the initial or previous flexible capacity 720 of namespace 712 may be reallocated to namespace 710 and added to updated flexible capacity 734 to resize its total allocated capacity. The physical allocation for namespace 712, as the source namespace for the flexible capacity in the floating namespace pool, may be changed such that physical memory blocks in the data storage device previously allocated to namespace 712 are now allocated to namespace 710. Note that during normal operation, a larger floating capacity pool may be available, including unallocated capacity from other memory locations, and the flexible capacity logic may organize the floating namespace pool in a prioritized stack of capacity units for resizing namespaces as more capacity is needed. The resulting reductions of capacity of other namespaces may continue until a low capacity threshold for the floating namespace pool triggers a notification to the system administrator that additional storage devices should be added.

Figures 8, 9:
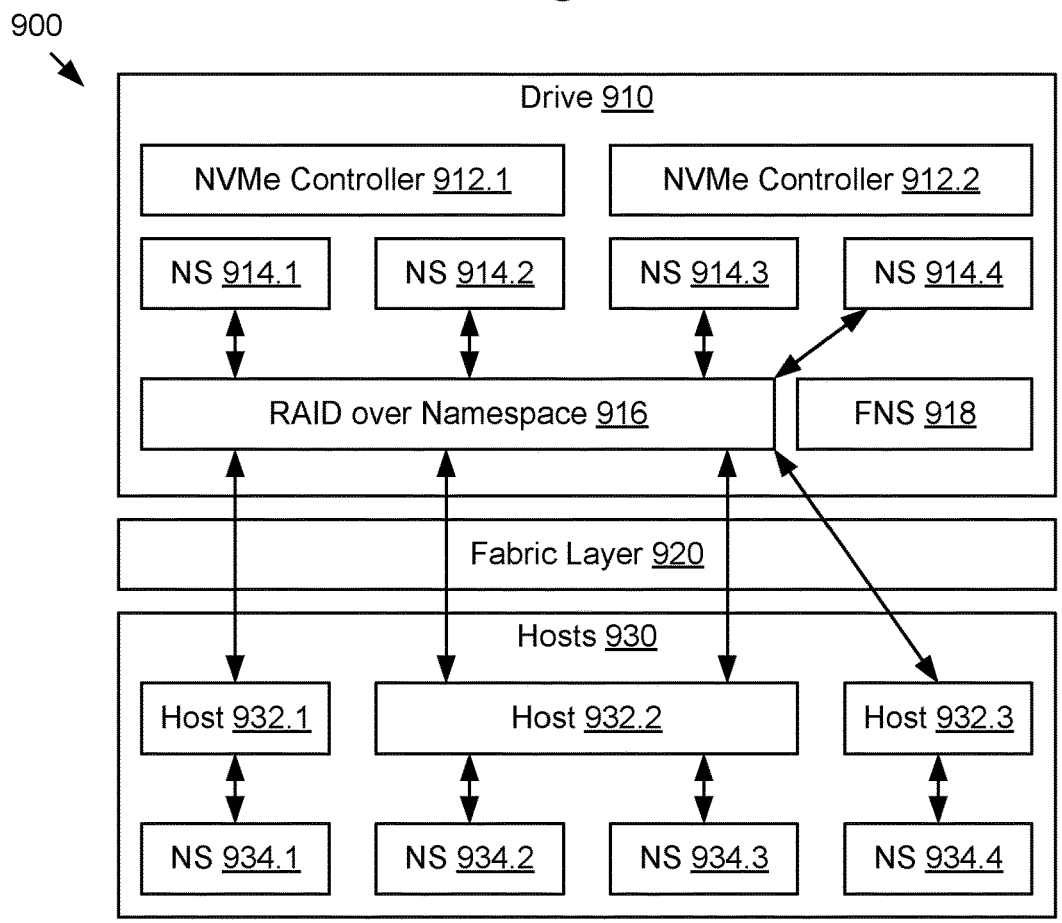
FIG. 8 schematically illustrates an example RAID configuration across four namespaces supporting dynamically allocated capacity.
FIG. 9 schematically illustrates an example system configuration for RAID over namespaces in a single data storage device.

FIG. 8 shows an example RAID configuration 820 across four namespaces 810.1-810.4 and how their allocated capacity supports dynamic allocation. Namespaces 810.1 may be in the same storage device or across storage devices in a storage node. In the example shown, all four namespaces 810.1-810.4 may have had the same allocated capacity, such as 1 TB per namespace, and flexible capacity is being used to adjust their guaranteed capacities based on their actual use. For example, each namespace has a different used capacity 812 and floating capacity 816, but the system maintains the same target buffer capacity 814 for each of them. Namespace 810.4 may be a fast filling type namespace and namespace 810.3 may be a slow filling type namespace.

In the example shown, RAID configuration 820 applies a RAID 6 across the four namespaces. For each RAID stripe, host data blocks A 822.1 and C 822.3 are written to namespace 810.1, host data block B 822.2 is written to namespace 810.2, and host data block D 822.4 is written to namespace 810.4. A parity block based on host data blocks A and B is calculated and stored as parity block AB 824.1 in namespace 810.3 and parity block AB 824.2 in namespace 810.4. A parity block based on host data blocks C and D is calculated and stored as parity block CD 824.3 in namespace 810.2 and parity block CD 824.4 in namespace 810.3. This RAID configuration and RAID stripe structure is shown as an example, but other RAID level, block parameters, and striping logic may be used.

FIG. 9 shows an example system 900 configured for RAID over namespaces in a single data storage device, such as drive 910. Drive 910 includes a pair of NVMe controllers 912.1 and 912.2 supporting four namespaces 914.1-914.4 attached to corresponding hosts 930. In the example shown, namespaces 914.1-914.4 participate in the RAID set for RAID over namespace 916. Namespaces 914.1-914.4 may be configured to support flexible capacity, resulting in floating namespace 918, which may provide flexible capacity allocation for namespaces 914.1-914.4 during operation of RAID 916. Floating namespace 918 is not attached to any host and may be invisible to hosts 930.

Drive 910 and NVMe controllers 912.1 and 912.2 may be configured to communicate with hosts 930 through fabric layer 920. In the example shown, host 932.1 may be configured to attach to a namespace 934.1 corresponding to namespace 914.1, host 932.2 may be configured to two namespaces 934.2 and 934.3 corresponding to namespaces 914.2 and 914.3, and host 932.3 may be configured to attach to a namespace 934.4 correspond to namespace 914.4. The host data directed by each of these hosts to their respective attached namespaces may be received and stored to RAID 916. For example, each host directs write commands to the queue pairs assigned to their connection to their respective namespaces. Drive 910 may include a RAID controller that allocates the host data to RAID data blocks, calculates parity, and stores both the host data blocks and parity blocks to namespaces 914.1-914.4.

In one example configuration, each of the four namespaces may be allocated 1 TB of memory in drive 910 and RAID 916 may be a RAID 5 configuration across the four namespaces. RAID 916 may be configured with a RAID capacity that is less than the total capacity of all four namespaces. For example, RAID 916 may be configured as a 3 TB RAID to support allocated capacities for each attached host and the host/namespace allocations do not need to be equal. Namespaces 934.1 and 934.2 may be configured as a 1 TB namespaces supported by RAID 916 and allocated to hosts 932.1 and 932.2 respectively. Namespaces 934.3 and 934.4 may be configured as 500 GB namespaces supported by RAID 916 and allocated to hosts 932.2 and 932.3 respectively. This may leave 1 TB of unallocated capacity from namespaces 914.1-914.4 to be used for floating namespace 918.

In another example configuration, the four namespaces on drive 910 may have different allocated capacities, such as 1 TB for namespace 914.1, 2 TB for namespace 914.2, 3 TB for namespace 914.3, and 4 TB for namespace 914.4. Hosts may have the same needs for namespaces 934.1-934.4 as the prior example and be supported by a 3 TB RAID, resulting in 6 TB of unused capacity being allocated to floating namespace pool 918. The 6 TB floating namespace pool may be unnecessary to support the flexible capacity needs of RAID 916 and floating namespace 918 may be used to support virtual namespaces and additional RAIDs over the floating namespace, as described above with regard to FIG. 6.

Figure 10:
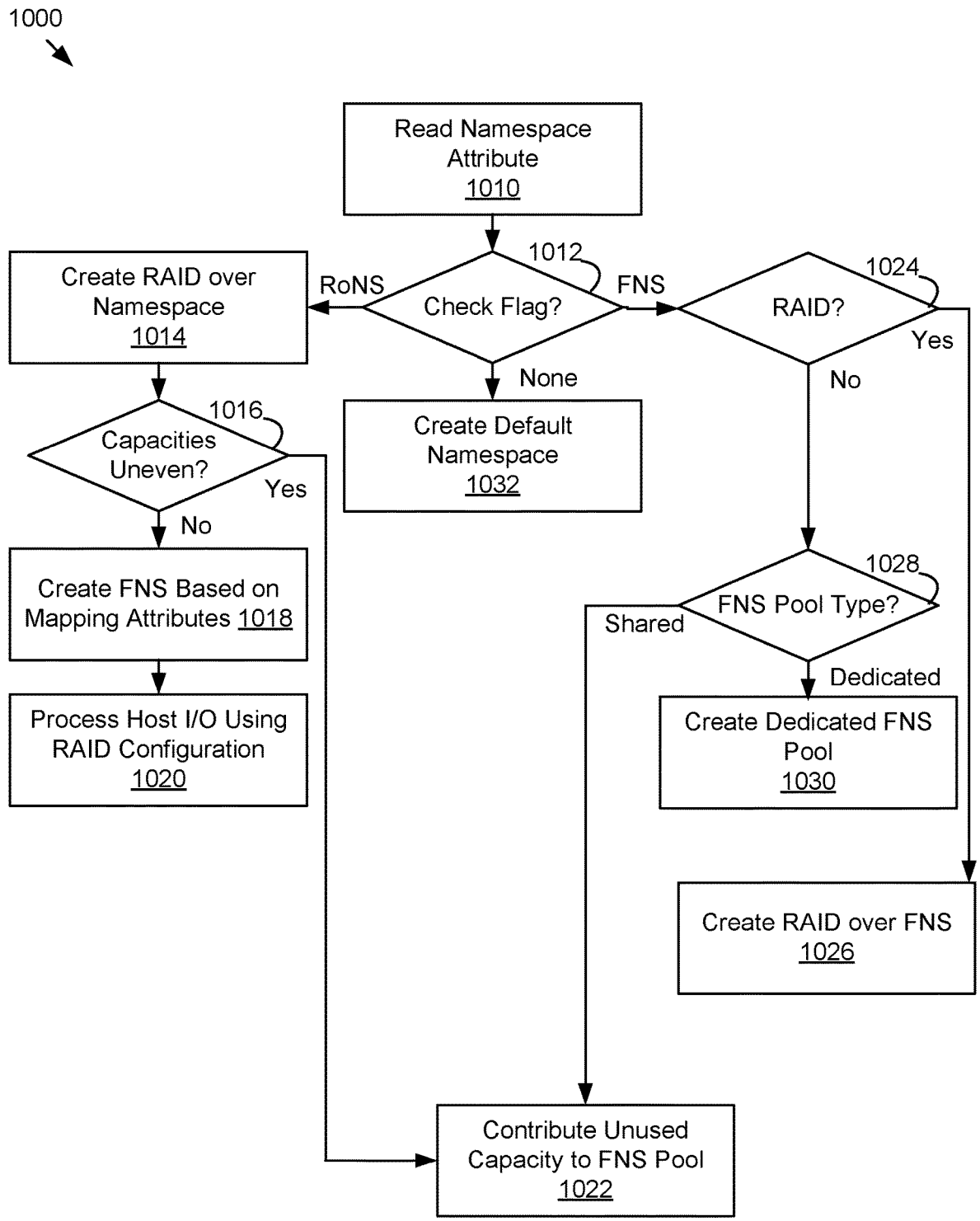
FIG. 10 is a flowchart of an example method of creating namespace-based RAID configurations.

As shown in FIG. 10, storage node 500 may be operated according to an example method for creating namespace-based RAID configurations, i.e., according to method 1000 illustrated by blocks 1010-1032 in FIG. 10.

At block 1010, namespace attributes may be read. For example, during namespace creation and/or during subsequent configuration of a RAID using that namespace, a controller may read one or more attributes associated with the namespace.

At block 1012, whether one or more flags indicate floating namespace, RAID over namespaces, or nothing may be determined. For example, a controller may access the namespace parameters in a namespace request or for an existing namespace and compare the values at the parameter locations to determine whether they indicate floating namespace (FNS) or RAID over namespaces (RoNS). If RoNS, method 1000 may proceed to block 1014. If FNS, method 1000 may proceed to block 1024. If neither RoNS or FNS flags are set, method 1000 may proceed to block 1032.

At block 1014, a RAID may be created over a set of namespaces. For example, the controller may use a RAID configuration indicated for the RAID and a target RAID set of namespaces to create a RAID for handling host storage commands.

At block 1016, whether the namespaces in the RAID set have uneven capacities may be determined. For example, the controller may check the allocated capacities of the namespaces included in the RAID set. If the capacities are not uneven (all namespaces have the same allocated capacity), method 1000 may proceed to block 1018. If the capacities are uneven (at least one namespace has a different allocated capacity than the others), method 1000 may proceed to block 1022.

At block 1018, a floating namespace may be created based on mapping attributes. For example, the controller may include flexible capacity logic that defines a portion of the namespaces that can be contributed to floating namespace and/or identifies unallocated capacity from outside of the namespaces.

At block 1020, host input/output (I/O) may be processed using the RAID configuration. For example, host storage commands directed to the namespaces participating in the RAID may be processed according to the RAID configuration to redundantly store the host data across the namespaces.

At block 1022, unused capacity may be contributed to the floating namespace pool. For example, a namespace with higher allocated capacity may have a portion of capacity that is not contributed to supporting the RAID capacity and that unused capacity may be allocated to the floating namespace pool.

At block 1024, whether or not the namespace is also configured for RAID may be evaluated. For example, the namespace attributes read at block 1010 may include separate FNS and RAID flags. If the namespace is also configured for RAID, method 1000 may proceed to block 1026. If the namespace is not configured for RAID, method 1000 may proceed to block 1028.

At block 1026, a RAID over floating namespace pool may be created. For example, after the namespace is configured and attached for host system use with flexible capacity, capacity contributed to the floating namespace pool may support definition of a RAID using excess capacity allocated to the floating namespace pool.

At block 1028, what type of floating namespace pool may be evaluated. For example, the namespace attributes may determine whether the flexible or unused capacity from the namespace should be contributed to a dedicated floating namespace pool or a shared floating namespace pool. If dedicated, method 1000 may proceed to block 1030. If shared, method 1000 may proceed to block 1022.

At block 1030, a dedicated floating namespace pool may be created. For example, the flexible capacity from the namespace may be used only for supporting flexible capacity and not used for supporting virtual namespaces or RAID over floating namespace.

At block 1032, a default namespace with fixed, guaranteed capacity may be created. For example, the controller may create a default namespace of the allocated capacity attached to a host for exclusive use of the allocated capacity (all capacity guaranteed and no flexibility to give or receive capacity units).

Figure 11:
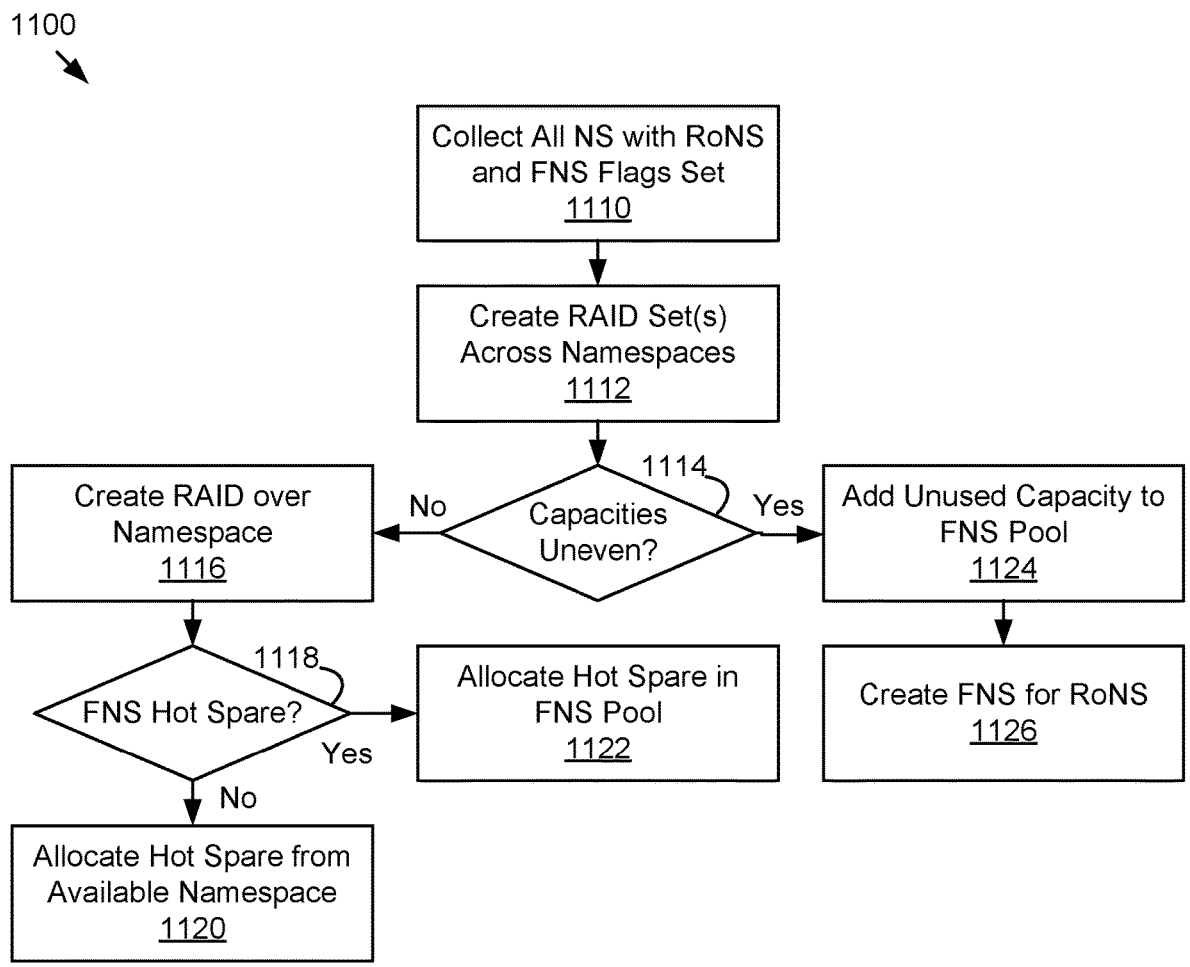
FIG. 11 is a flowchart of an example method of aggregating and allocating a floating namespace pool for a namespace-based RAID configuration.

As shown in FIG. 11, storage node 500 may be operated according to an example method for aggregating and allocating a floating namespace pool for a namespace-based RAID configuration, i.e., according to method 1100 illustrated by blocks 1110-1126 in FIG. 11.

At block 1110, all namespaces with RAID over namespace and floating/flexible namespace flags set may be collected. For example, the controller may aggregate the flexible capacity and unallocated capacity across the namespaces with these flags.

At block 1112, one or more RAID sets may be created across namespaces. For example, the controller may configure at least one RAID across the namespaces indicating RoNS or as requested by the host systems.

At block 1114, whether the namespaces in the RAID set have uneven capacities may be determined. For example, the controller may check the allocated capacities of the namespaces included in the RAID set. If the capacities are not uneven (all namespaces have the same allocated capacity), method 1100 may proceed to block 1116. If the capacities are uneven (at least one namespace has a different allocated capacity than the others), method 1100 may proceed to block 1024.

At block 1116, a RAID over namespace may be created. For example, the controller may define a RAID configuration for the RAID set created at block 1112.

At block 1118, whether or not the RAID is configured to use a floating namespace hot spare may be determined. For example, one of the configuration parameters for the RAID may be a flag that determines whether a virtual namespace should be allocated from the floating namespace pool to be used as a hot spare in the event of namespace failure. If yes, method 1100 may proceed to block 1122. If no, method 1100 may proceed to block 1120.

At block 1120, a hot spare may be allocated from an available namespace. For example, an unused namespace on the same drive or another drive in the node may be allocated as a hot spare and be placed in reserve until a failure occurs.

At block 1122, a hot spare may be allocated in the floating namespace pool. For example, the controller may designate a portion of the floating namespace pool as reserved for use as a hot spare.

At block 1124, unused capacity from the uneven (higher) namespaces may be added to the floating namespace pool. For example, the controller may evaluate each of the namespaces in the RAID set to identify any that have higher capacity that is not needed to support the RAID configuration and that excess capacity may be aggregated in the floating namespace pool for other uses.

At block 1126, a floating namespace pool for the RAID may be created. For example, the unused capacity and flexible capacity from the namespaces in the RAID may form a dedicated floating namespace pool to support the RAID and/or be contributed to a shared floating namespace pool for the drive or storage node.

Figure 12:
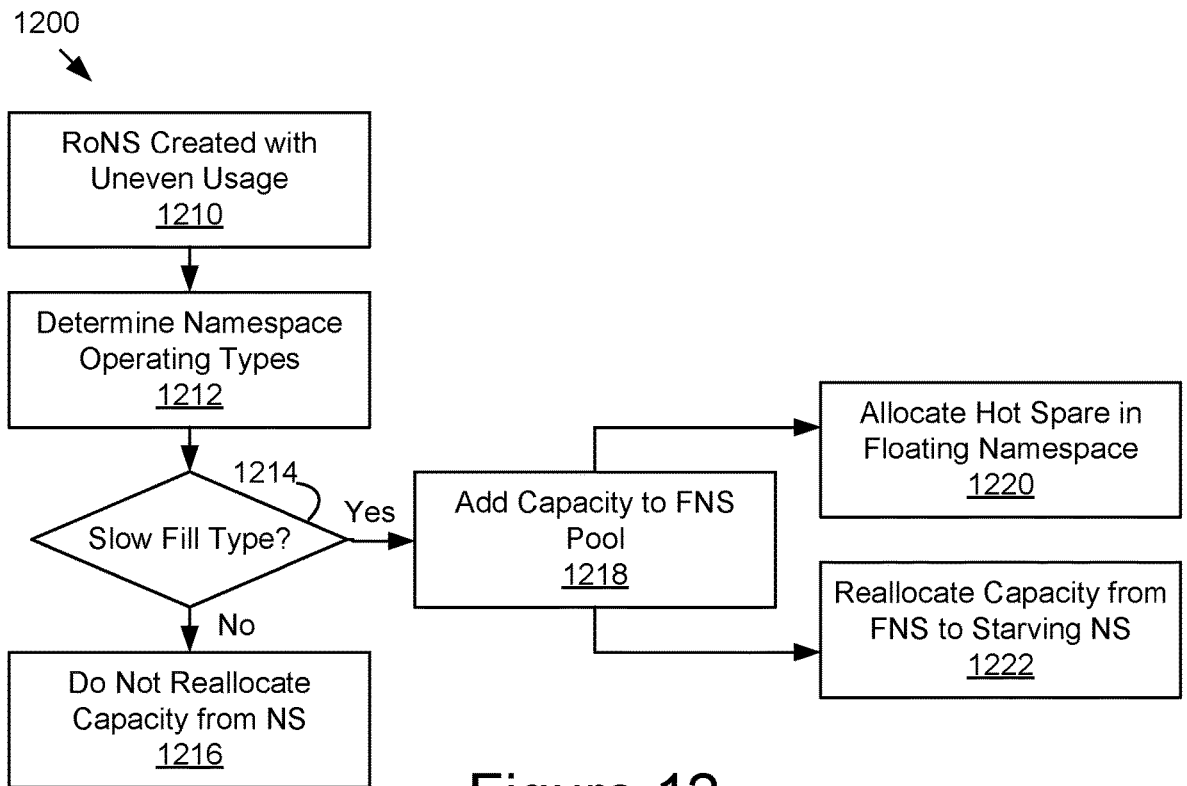
FIG. 12 is a flowchart of an example method of reallocating namespace capacity in a namespace-based RAID configuration with a floating namespace pool.

As shown in FIG. 12, storage node 500 may be operated according to an example method for reallocating namespace capacity in a namespace-based RAID configuration with a floating namespace pool, i.e., according to method 1200 illustrated by blocks 1210-1222 in FIG. 12.

At block 1210, a RAID over namespaces may be created with uneven usage. For example, some namespaces may receive more host data, greater write operations, and/or more intensive I/O compared to other namespaces in the same RAID.

At block 1212, a namespace operating type may be determined. For example, the controller may classify namespaces according to their operations for categories such as fast filling or slow filling.

At block 1214, whether a namespace in the RAID is a slow filling type may be evaluated. For example, the controller may evaluate current operations and/or namespace operating types previously assigned to the namespace. If the namespace is slow filling, method 1200 may proceed to 1218. If the namespace is not slow filling, method 1200 may proceed to 1216.

At block 1216, capacity may not be reallocated from the namespace. For example, as other namespaces in the RAID (or elsewhere in the storage node) are starved for capacity, this namespace will maintain its guaranteed and allocated capacity in favor of capacity being transferred from other namespaces.

At block 1218, capacity may be added to the floating namespace pool. For example, slow filling namespaces may be preferentially targeted for providing capacity units to the floating namespace pool.

At block 1220, a hot spare may be allocated from the floating namespace pool. For example, the floating namespace pool may be used to allocate a hot spare for the RAID by aggregating capacity from unevenly large namespaces and/or slow filling namespaces.

At block 1222, capacity from the floating namespace pool may be reallocated to starving namespaces. For example, as a fast filling namespace in the RAID set starts to run out of capacity, the controller may reallocate capacity units from the floating namespace pool (contributed by slow filling or unevenly large namespaces) to the starving namespace.

Figure 13:
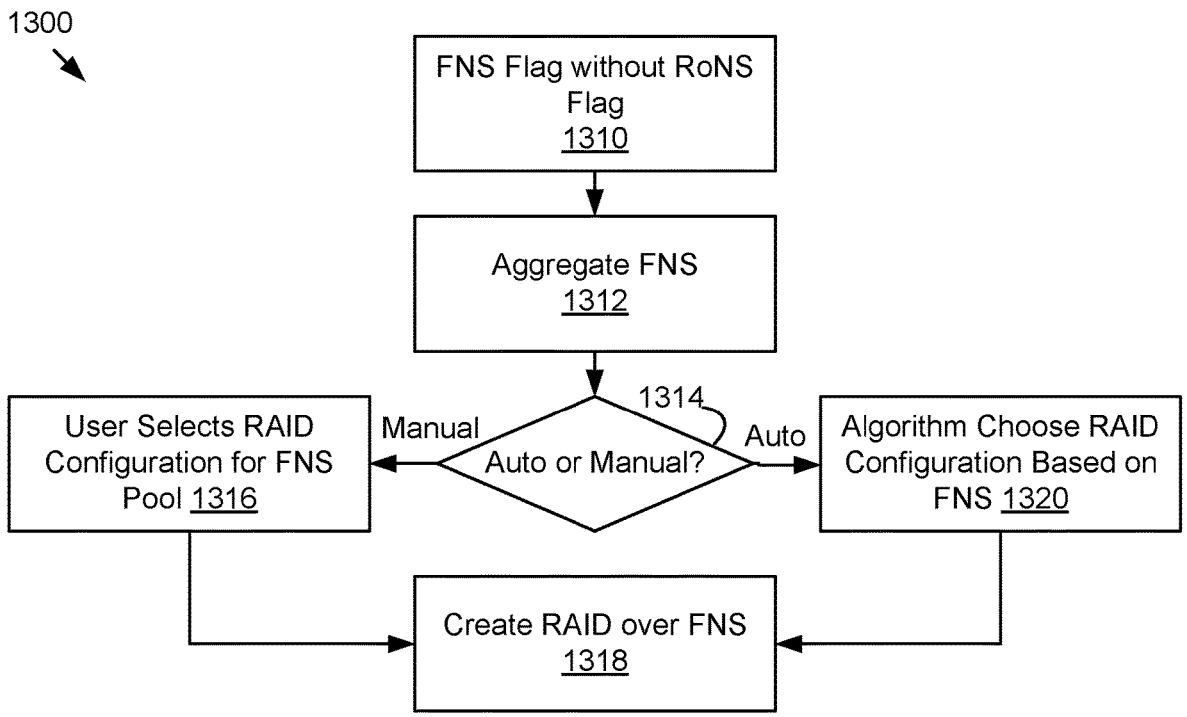
FIG. 13 is a flowchart of an example method of using a RAID configuration within a flexible namespace pool.

As shown in FIG. 13, storage node 500 may be operated according to an example method for using a RAID configuration within a floating namespace pool, i.e., according to method 1300 illustrated by blocks 1310-1320 in FIG. 13.

At block 1310, namespaces are determined to have a floating namespace flag without a RAID over namespace flag. For example, the namespaces may be configured to contribute to the floating namespace pool by sharing flexible capacity but are not configured to provide a namespace-based RAID (just operate as flexible namespaces supporting their respective host connections directly).

At block 1312, the floating namespace pool may be aggregated. For example, across all of the namespaces in the drive or storage node, flexible capacity may be aggregated into the floating namespace pool and may be increased by any unallocated capacity in the drive or storage node.

At block 1314, whether creating RAID over the floating namespace pool is configured for automatic or manual may be determined. For example, some storage nodes may be configured to automatically generate a RAID configuration based on some portion of the unallocated floating namespace pool and/or configured to publish the available capacity for manual configuration of a RAID be a host system or system administrator. If manual, method 1300 may proceed to block 1316. If automatic, method 1300 may proceed to block 1320.

At block 1316, a user of a host system or system administrator may select the RAID configuration for a RAID comprised of unallocated capacity from the floating namespace pool. For example, the controller may publish available capacity and receive RAID configuration parameters that include RAID level, number of RAID nodes in the RAID set, and the capacity allocation for each node.

At block 1318, a RAID of the selected configuration may be created from the capacity units of the floating namespace pool. For example, based on either the manually or automatically selected RAID configuration, RAID nodes of the selected capacity and number may be allocated as virtual namespaces and made available for host attachment and use.

At block 1320, an algorithm may choose the RAID configuration based on the floating namespace. For example, the controller may include an algorithm for determining the available capacity and an optimized RAID configuration for using the available capacity to provide redundant storage.

Figure 14:
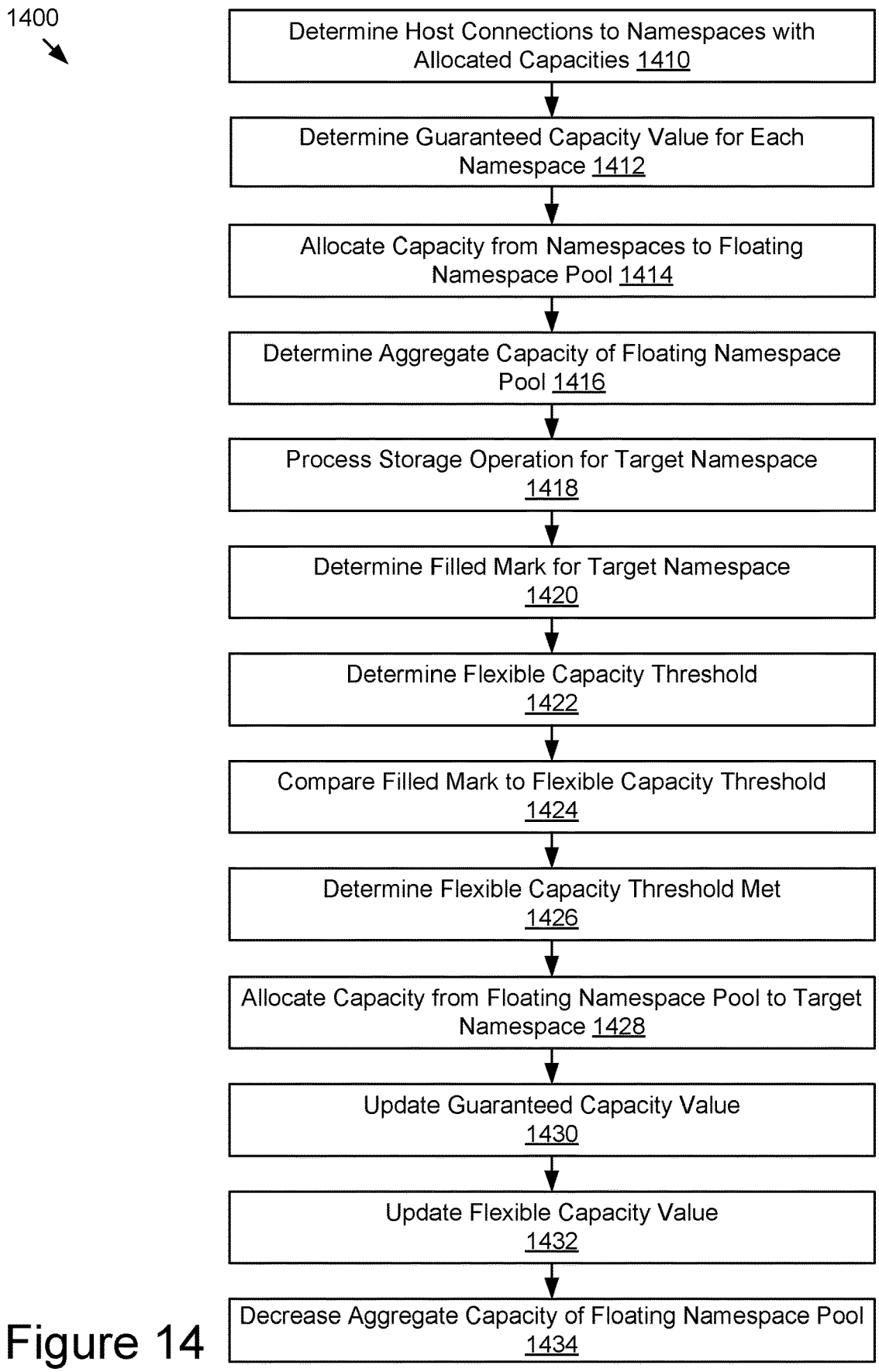
FIG. 14 is a flowchart of an example method of dynamically allocating capacity among namespace using a floating namespace pool.

As shown in FIG. 14, storage node 500 may be operated according to an example method for using capacity from the floating namespace pool to allocate additional capacity to a namespace, i.e., according to method 1400 illustrated by blocks 1410-1434 in FIG. 14.

At block 1410, host connections may be determined to a set of namespaces with allocated capacities. For example, a namespace manager may be used to configure a set of namespaces that each have an allocated capacity corresponding to a defined set of memory locations in the storage device.

At block 1412, a guaranteed capacity may be determined for each namespace. For example, as each namespace was created, the namespace manager may have determined a guaranteed capacity value based on default or custom allocation of guaranteed and flexible capacity.

At block 1414, capacity from the namespaces may be allocated to a floating namespace pool. For example, the namespace manager may determine that the remainder of the allocated capacity for each namespace that is not part of the guaranteed capacity value corresponds to a flexible capacity value that can be contributed to a floating namespace pool.

At block 1416, an aggregate capacity of the floating namespace pool may be determined. For example, the namespace manager may sum the flexible capacity value from each namespace contributing to the floating namespace pool to determine an aggregate capacity of the floating namespace pool.

At block 1418, storage operations may be processed for a target namespace among the set of namespaces. For example, a connected host system may send read, write, and/or other storage commands to the namespace in accordance with a storage protocol and those storage commands may be processed by the storage device in which that namespace is instantiated.

At block 1420, a filled mark may be determined for the target namespace. For example, after each storage operation is processed or on some other event or conditional basis, the namespace manager may update the operating parameters for the storage device and the namespaces it contains to track the memory locations and corresponding portion of the namespace capacity that is currently occupied by host data.

At block 1422, a flexible capacity threshold may be determined. For example, the namespace manager may be configured with one or more capacity thresholds for determining when a namespace should be allocated additional capacity, such as a buffer capacity value offset from the guaranteed capacity (a capacity threshold less than the guaranteed capacity) or a percentage of the flexible capacity that has been used (a capacity threshold greater than the guaranteed capacity).

At block 1424, the filled mark may be compared to the flexible capacity threshold. For example, the namespace manager may compare the current filled mark for the namespace to the corresponding flexible capacity threshold for that namespace.

At block 1426, the flexible capacity threshold may be determined to be met. For example, the current filled mark may equal or exceed the flexible capacity threshold, At block 1428, capacity from the floating namespace pool may be allocated to the target namespace. For example, responsive to the flexible capacity threshold being met by the filled mark, the namespace manager may select a number of capacity units from the floating namespace pool for increasing the allocated capacity of the target namespace.

At block 1430, a guaranteed capacity value may be updated. For example, the namespace manager may increase the guaranteed capacity value equal to the new capacity units allocated to the target namespace and at least meet the current filled mark.

At block 1432, a flexible capacity value may be updated. For example, the namespace manager may change the flexible capacity value to be equal to the difference between the updated guaranteed capacity value and the updated allocated capacity for the namespace and, in some embodiments, may be maintained as a fixed flexible capacity or percentage of the allocated capacity.

At block 1434, aggregate capacity of the floating namespace pool may be decreased. For example, the namespace manager may decrease the remaining aggregate capacity of the floating namespace pool for the capacity units added to the target namespace. In some embodiments, the capacity units may be removed from the flexible capacity of another namespace in the set of namespaces and the flexible capacity of that namespace may also be updated.

Figure 15:
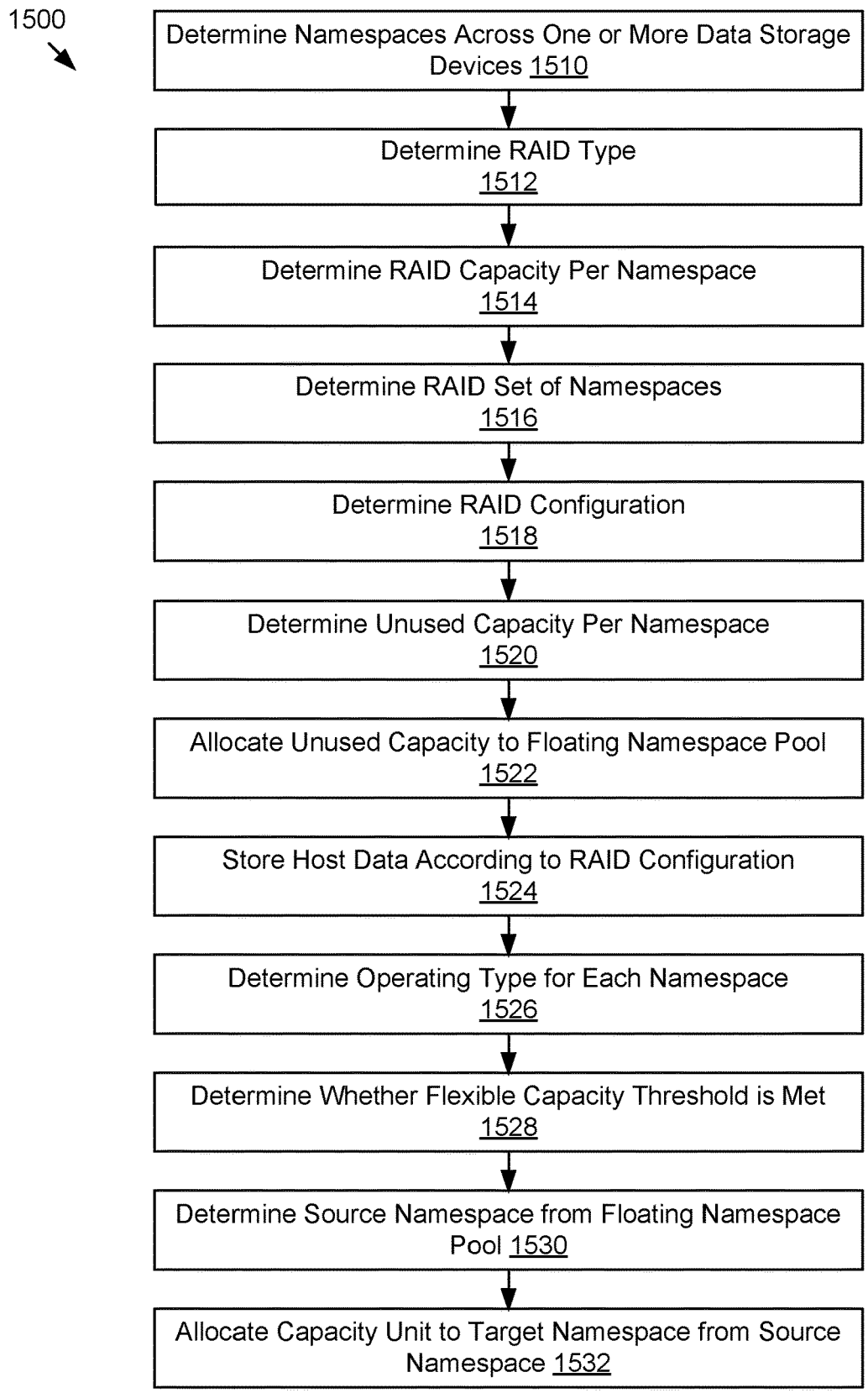
FIG. 15 is a flowchart of an example method of implementing RAID over namespaces with a floating namespace pool.

As shown in FIG. 15, storage node 500 may be operated according to an example method for implementing RAID over namespaces with a floating namespace pool, i.e., according to method 1500 illustrated by blocks 1510-1532 in FIG. 15.

At block 1510, namespaces may be determined across one or more data storage devices. For example, a controller may configure a plurality of namespaces across a single data storage device or across a group of data storage devices in a storage node.

At block 1512, a RAID type may be determined. For example, the controller may select or receive a RAID level and number of nodes for a RAID configuration.

At block 1514, RAID capacity may be determined per namespace. For example, the controller may divide the total capacity of the RAID configuration across the number of namespaces acting as nodes in the RAID set.

At block 1516, a RAID set of namespaces may be determined. For example, the controller may assign each node in the RAID configuration to a different namespace and the namespaces receiving those assignments may become the namespaces of the RAID set.

At block 1518, a RAID configuration may be determined. For example, the controller may select or receive additional parameters for defining the RAID, such as block size, stripe logic, parity handling, etc.

At block 1520, unused capacity may be determined per namespace. For example, the controller may determine capacity from each namespace that may be contributed to the floating namespace pool, such as unused flexible capacity or capacity in excess of the RAID capacity for that node.

At block 1522, unused capacity may be allocated to a floating namespace pool. For example, the unused capacity determined at block 1520 may be added to the capacity stack and corresponding memory locations available to the floating namespace pool.

At block 1524, host data may be stored according to the RAID configuration. For example, one or more host systems may be attached to the namespaces participating in the RAID and host I/O directed to those namespaces may be written to the RAID set of storage devices according to the RAID configuration.

At block 1526, an operating type may be determined for each namespace. For example, the controller may use an operating type parameter and/or analysis of operating characteristics to classify operating types of each namespace.

At block 1528, a flexible capacity threshold may be met. For example, RAID storage operations to at least one of the namespaces may have a filled line that meets the flexible capacity threshold to trigger an increase in namespace capacity as a target namespace.

At block 1530, a source namespace may be determined from the floating namespace pool. For example, in order to increase the capacity of the target namespace, unused capacity may be committed from the floating namespace pool and, if no unallocated capacity is available in the floating namespace pool from outside the namespaces, then one of the namespaces may be identified as a source. Selection of the source namespace may include a prioritization based on unallocated capacity and/or operating type, favoring namespaces with greater than the RAID capacity and slow filling namespaces.

At block 1532, a capacity unit may be allocated to the target namespace and removed from the flexible capacity or unallocated capacity of the source namespace. For example, the memory locations may be reassigned from the source namespace to the target namespace and the host systems may be notified of the change in namespace capacity allocations.

Figure 16:
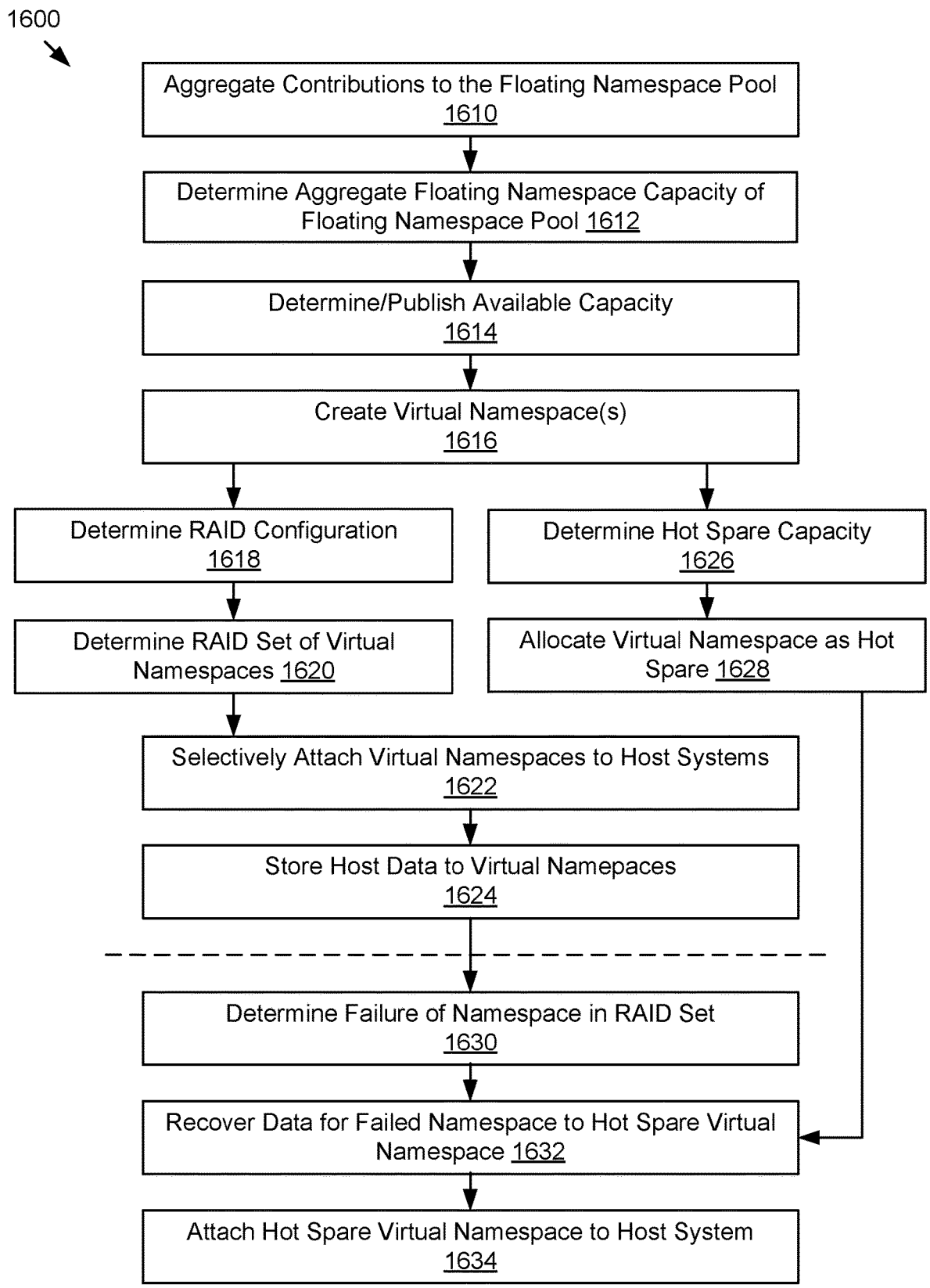
FIG. 16 is a flowchart of an example method of using a floating namespace pool to support virtual namespaces with RAID and hot spares.

As shown in FIG. 16, storage node 500 may be operated according to an example method for using a floating namespace pool to support virtual namespaces with RAID and hot spares, i.e., according to method 1600 illustrated by blocks 1610-1634 in FIG. 16.

At block 1610, contributions to the floating namespace pool may be aggregated. For example, the controller may add flexible and unallocated memory locations from each namespace, as well as other unallocated capacity, to the memory stack of capacity units in the floating namespace pool.

At block 1612, an aggregate floating namespace capacity for the floating namespace pool may be determined. For example, the controller may determine the unallocated capacity of the floating namespace pool.

At block 1614, available capacity from the floating namespace pool may be published. For example, the controller may send an available capacity parameter to host systems and/or system administrators. Note that available capacity may be less than the total aggregate capacity, as the controller may be configured to reserve a portion of the floating namespace pool to support the flexible capacity of namespaces and/or other features.

At block 1616, virtual namespaces may be created from the floating namespace pool. For example, the controller may, responsive to a configuration request or based on automated logic, allocate available capacity from the floating namespace pool to one or more virtual namespaces, assigning memory locations to a namespace identifier that can be managed and, if appropriate, published for connection by one or more host systems.

At block 1618, a RAID configuration may be determined. For example, a configuration request or the automated logic may include configuration of a RAID from virtual namespaces in the floating namespace pool.

At block 1620, a RAID set of virtual namespaces may be determined. For example, the controller may select or define virtual namespaces to participate as nodes in a RAID set for the RAID configuration determined at block 1618.

At block 1622, virtual namespaces may be selectively attached to host systems. For example, virtual namespaces and/or RAIDs comprised of virtual namespaces may be made available for host system access and use.

At block 1624, host data may be stored to virtual namespaces. For example, the controller may receive and process storage requests from the attached host systems to the virtual namespaces, which may include redundant storage for storage operations directed to a RAID.

At block 1626, host spare capacity may be determined. For example, the controller may determine that one or more RAIDs defined in the storage node are configured to be supported by a hot spare in the floating namespace and determine the needed capacity for a hot spare capable of rebuilding a failed namespace.

At block 1628, a virtual namespace may be allocated as a hot spare. For example, the controller may create and/or resize a virtual namespace with the determined hot spare capacity and allocate it as a hot spare to a particular RAID.

At block 1630, a failure of a namespace in the RAID set may be determined. For example, the controller may detect that a namespace (and/or storage device containing the namespace) is no longer responding to storage requests or otherwise identified as unavailable.

At block 1632, data may be recovered for the failed namespace to the hot spare virtual namespace. For example, the controller may use a RAID rebuild based on the host data and parity data in the remaining namespaces to recreate the lost data from the failed namespace and store that recovered data in the virtual namespace designated as hot spare.

At block 1634, the hot spare virtual namespace may be attached to the host system. For example, after successful rebuild of the failed namespace data, the hot spare virtual namespace may be attached to the host system previously attached to the failed namespace to migrate storage operations and replace the failed namespace.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
   at least one data storage device, wherein each data storage device of the at least one data storage device comprises:
   a non-volatile storage medium configured to store host data for at least one host system; and
   a host interface configured to communicate with the at least one host system using a storage protocol; and a controller configured to:
  determine a plurality of host connections to a plurality of namespaces in the at least one data storage device, wherein:
    each namespace of the plurality of namespaces has a first allocated capacity;
    at least one namespace of the plurality of namespaces is configured to allocate a portion of the first allocated capacity to a floating namespace pool; and
    the portion of the first allocated capacity allocated to the floating namespace pool remains allocated to that at least one namespace until used by another namespace;
  determine a redundant array of independent disks (RAID) configuration comprising a RAID set of namespaces from the plurality of namespaces;
  store, based on the RAID configuration, host data to the RAID set of namespaces;
  determine, for a target namespace of the RAID set of namespaces, whether a filled mark of the target namespace meets a flexible capacity threshold for the target namespace; and
  allocate, responsive to the filled mark meeting the flexible capacity threshold, a capacity unit from the floating namespace pool to the target namespace to increase the first allocated capacity to a second allocated capacity.

2. The system of claim 1, wherein:
  the RAID set of namespaces comprises only namespaces in the non-volatile storage medium of a first data storage device of the at least one data storage device;
  a first namespace of the RAID set of namespaces is configured to store a first block of host data; and
  a second namespace of the RAID set of namespaces is configured to store a parity block based on the first block of host data.

3. The system of claim 1, wherein the controller is further configured to:
  determine a RAID capacity of each namespace of the RAID set of namespaces for the at least one data storage device; and
  determine, based on a difference between the first allocated capacity and the RAID capacity of each namespace of the RAID set of namespaces, an unused capacity allocated to the floating namespace pool.

4. The system of claim 1, wherein:
  the at least one data storage device comprises a plurality of data storage devices; and
  the RAID set of namespaces comprises namespaces on at least two data storage devices of the plurality of data storage devices.

5. The system of claim 1, wherein the controller is further configured to:
  receive a request for a new namespace in the plurality of namespaces;
  determine, from the request, a flexible capacity flag;
  selectively determine, based on the flexible capacity flag and for the new namespace, a number of capacity units from the new namespace to allocate to the floating namespace pool;
  determine, from the request, a redundancy flag; and
  selectively determine, based on the redundancy flag, that the new namespace is in the RAID set of namespaces.

6. The system of claim 1, wherein:
  the controller is further configured to:
    determine, for each namespace of the plurality of namespaces, whether that namespace is an operating type selected from:
      a fast filling namespace; or
      a slow filling namespace; and
    determine, responsive to allocating the capacity unit from the floating namespace pool and based on the operating type for each namespace of the plurality of namespaces, a source namespace for a physical allocation of the capacity unit;
  the source namespace is selected from among slow filling namespaces; and
  the first allocated capacity of the source namespace is reduced by the capacity unit.

7. The system of claim 6, wherein:
  the target namespace is a first namespace in the RAID set of namespaces; and
  the source namespace is a second namespace in the RAID set of namespaces.

8. The system of claim 1, wherein the controller is further configured to:
  aggregate contributions to the floating namespace pool from the plurality of namespaces to determine a floating namespace capacity;
  create at least one virtual namespace using a portion of the floating namespace capacity; and
  attach the at least one virtual namespace to at least one host system.

9. The system of claim 8, wherein:
  the at least one virtual namespace comprises a plurality of virtual namespaces; and
  the controller is further configured to:
    determine a second RAID configuration comprised of a second RAID set of namespaces selected from the plurality of virtual namespaces; and
    store, based on the second RAID configuration, host data to the plurality of virtual namespaces.

10. The system of claim 1, wherein the controller is further configured to:
  determine a hot spare capacity for the RAID configuration;
  allocate the hot spare capacity from the floating namespace pool to a virtual namespace;
  recover, responsive to a failure of a namespace in the RAID set of namespaces, data from the failed namespace to the virtual namespace; and
  attach the virtual namespace to a host system previously attached to the failed namespace.

11. A computer-implemented method, comprising:
  determining a plurality of host connections to a plurality of namespaces in a non-volatile storage medium of at least one data storage device, wherein:
    each namespace of the plurality of namespaces has a first allocated capacity;
    at least one namespace of the plurality of namespaces allocates a portion of the first allocated capacity to a floating namespace pool; and
    the portion of the first allocated capacity allocated to the floating namespace pool remains allocated to that at least one namespace until used by another namespace;
  determining a redundant array of independent disks (RAID) configuration comprising a RAID set of namespaces from the plurality of namespaces;
  storing, based on the RAID configuration, host data to the RAID set of namespaces;

determining, for a target namespace of the RAID set of namespaces, whether a filled mark of the target namespace meets a flexible capacity threshold for the target namespace; and allocating, responsive to the filled mark meeting the flexible capacity threshold, a capacity unit from the floating namespace pool to the target namespace to increase the first allocated capacity to a second allocated capacity.

12. The computer-implemented method of claim 11, wherein:
the RAID set of namespaces comprises only namespaces in the non-volatile storage medium of a first data storage device of the at least one data storage device;
a first namespace of the RAID set of namespaces is configured to store a first block of host data; and
a second namespace of the RAID set of namespaces is configured to store a parity block based on the first block of host data.

13. The computer-implemented method of claim 11, further comprising:
determining a RAID capacity of each namespace of the RAID set of namespaces for the at least one data storage device; and
determining, based on a difference between the first allocated capacity and the RAID capacity of each namespace of the RAID set of namespaces, an unused capacity allocated to the floating namespace pool.

14. The computer-implemented method of claim 11, wherein:
the at least one data storage device comprises a plurality of data storage devices; and
the RAID set of namespaces comprises namespaces on at least two data storage devices of the plurality of data storage devices.

15. The computer-implemented method of claim 11, further comprising:
receiving a request for a new namespace in the plurality of namespaces;
determining, from the request, a flexible capacity flag;
selectively determining, based on the flexible capacity flag and for the new namespace, a number of capacity units from the new namespace to allocate to the floating namespace pool;
determining, from the request, a redundancy flag; and
selectively determining, based on the redundancy flag, that the new namespace is in the RAID set of namespaces.

16. The computer-implemented method of claim 11, further comprising:
determining, for each namespace of the plurality of namespaces, whether that namespace is an operating type selected from:
a fast filling namespace; or
a slow filling namespace; and
determining, responsive to allocating the capacity unit from the floating namespace pool and based on the operating type for each namespace of the plurality of namespaces, a source namespace for the physical allocation of the capacity unit, wherein:
the source namespace is selected from among slow filling namespaces;
the first allocated capacity of the source namespace is reduced by the capacity unit;
the target namespace is a first namespace in the RAID set of namespaces; and
the source namespace is a second namespace in the RAID set of namespaces.

17. The computer-implemented method of claim 11, further comprising:
aggregating contributions to the floating namespace pool from the plurality of namespaces to determine a floating namespace capacity;
creating at least one virtual namespace using a portion of the floating namespace capacity; and
attaching the at least one virtual namespace to at least one host system.

18. The computer-implemented method of claim 17, further comprising:
determining a second RAID configuration comprised of a second RAID set of namespaces selected from a plurality of virtual namespaces of the at least one virtual namespace; and
storing, based on the second RAID configuration, host data to the plurality of virtual namespaces.

19. The computer-implemented method of claim 11, further comprising:
determining a hot spare capacity for the RAID configuration;
allocating the hot spare capacity from the floating namespace pool to a virtual namespace;
recovering, responsive to a failure of a namespace in the RAID set of namespaces, data from the failed namespace to the virtual namespace; and
attaching the virtual namespace to a host system previously attached to the failed namespace.

20. A data storage device comprising:
a processor;
a memory;
a non-volatile storage medium configured to store host data for at least one host system;
a host interface configured to communicate with the at least one host system using a storage protocol;
means for determining a plurality of host connections to a plurality of namespaces in the non-volatile storage medium, wherein:
each namespace of the plurality of namespaces has a first allocated capacity;
at least one namespace of the plurality of namespaces is configured to allocate a portion of the first allocated capacity to a floating namespace pool; and
the portion of the first allocated capacity allocated to the floating namespace pool remains allocated to that at least one namespace until used by another namespace;
means for determining a redundant array of independent disks (RAID) configuration comprising a RAID set of namespaces including the plurality of namespaces;
means for storing, based on the RAID configuration, host data to the RAID set of namespaces;
means for determining, for a target namespace of the RAID set of namespaces, whether a filled mark of the target namespace meets a flexible capacity threshold for the target namespace; and
means for allocating, responsive to the filled mark meeting the flexible capacity threshold, a capacity unit from the floating namespace pool to the target namespace to increase the first allocated capacity to a second allocated capacity.

* * * * *